United States Patent [19]

Wardle et al.

[11] Patent Number: 5,088,383
[45] Date of Patent: Feb. 18, 1992

[54] MULTIPLEXED HYDRAULIC CONTROL SYSTEM WITH MULTIPLEXING VALVE HAVING PLANAR PORT ARRAY

[75] Inventors: John W. Wardle, Roscoe; Plato J. Leeson; David G. Clay, both of Rockford; Dale W. Sievert, Freeport, all of Ill.

[73] Assignee: Woodward Governor Company, Rockford, Ill.

[21] Appl. No.: 468,353

[22] Filed: Jan. 22, 1990

[51] Int. Cl.$^5$ .............................. F15B 9/07; F15B 9/09
[52] U.S. Cl. ........................................... 91/361; 91/3; 91/461; 91/521; 91/529; 137/83; 137/596.15; 137/625.11; 137/884
[58] Field of Search ................. 91/361, 536, 461, 521, 91/529, 3; 137/625, 625.11, 884, 83, 596.15

[56] References Cited

U.S. PATENT DOCUMENTS

| | | | |
|---|---|---|---|
| 3,282,283 | 11/1966 | Takeda | 137/83 |
| 3,473,547 | 10/1969 | Coakley | 137/83 |
| 3,645,141 | 2/1972 | Moore et al. | 73/420 |
| 3,670,626 | 6/1972 | Olson et al. | 137/83 X |
| 3,678,951 | 7/1972 | Coakley | 137/83 X |
| 4,191,215 | 3/1980 | Gonner | 137/870 |
| 4,271,867 | 6/1981 | Milberger et al. | 137/625 |
| 4,325,127 | 4/1982 | Major | 364/510 |
| 4,605,042 | 8/1986 | Zettergren | 91/529 X |
| 4,638,720 | 1/1987 | McKee et al. | 91/522 |
| 4,664,136 | 5/1987 | Everett | 137/85 |
| 4,712,173 | 12/1987 | Fujiwara et al. | 364/138 |
| 4,838,145 | 6/1989 | Slocum et al. | 91/536 |
| 4,913,032 | 4/1990 | Wernberg | 91/361 |
| 4,986,305 | 1/1991 | Richards et al. | 137/625.15 |
| 5,005,600 | 4/1991 | Jacobsen et al. | 137/83 |

FOREIGN PATENT DOCUMENTS 2174824 11/1986 United Kingdom .

OTHER PUBLICATIONS

"Imagine ... A Self-Calibrating Pressure Transducer", advertisement for Scanivalve Corp., San Diego, California, 1987.
"Metering Valve W/Regulator" article, Tech Data South Bend Controls Inc. Bulletin, PV-210, SCB, 1987.
"Metering Valve" article Tech Data South Bend Controls Inc. Bulletin, PV-211, SBC, 1987.
Article entitled "Actuator Accepts Electrical Digital Control Signals Directly—Eliminates Digital-to-Analog Converters".

Primary Examiner—Edward K. Look
Assistant Examiner—George Kapsalas
Attorney, Agent, or Firm—Leydig, Voit & Mayer

[57] ABSTRACT

A multiplexed hydraulic control system which avoids the use of a rotary multiplexer and thereby allows for random selection of the multiplexed outlet ports and variable dwell times for the respective ports. A single hydraulic input is multiplexed among a plurality of hydraulic outputs. A control system provides two types of signals: (1) modulation signals selected from a plurality of multiplexed input signals for producing a modulating hydraulic flow, and (2) selector signals for operating on the multiplexer means to route the modulated signal to the appropriately selected channel.

19 Claims, 10 Drawing Sheets

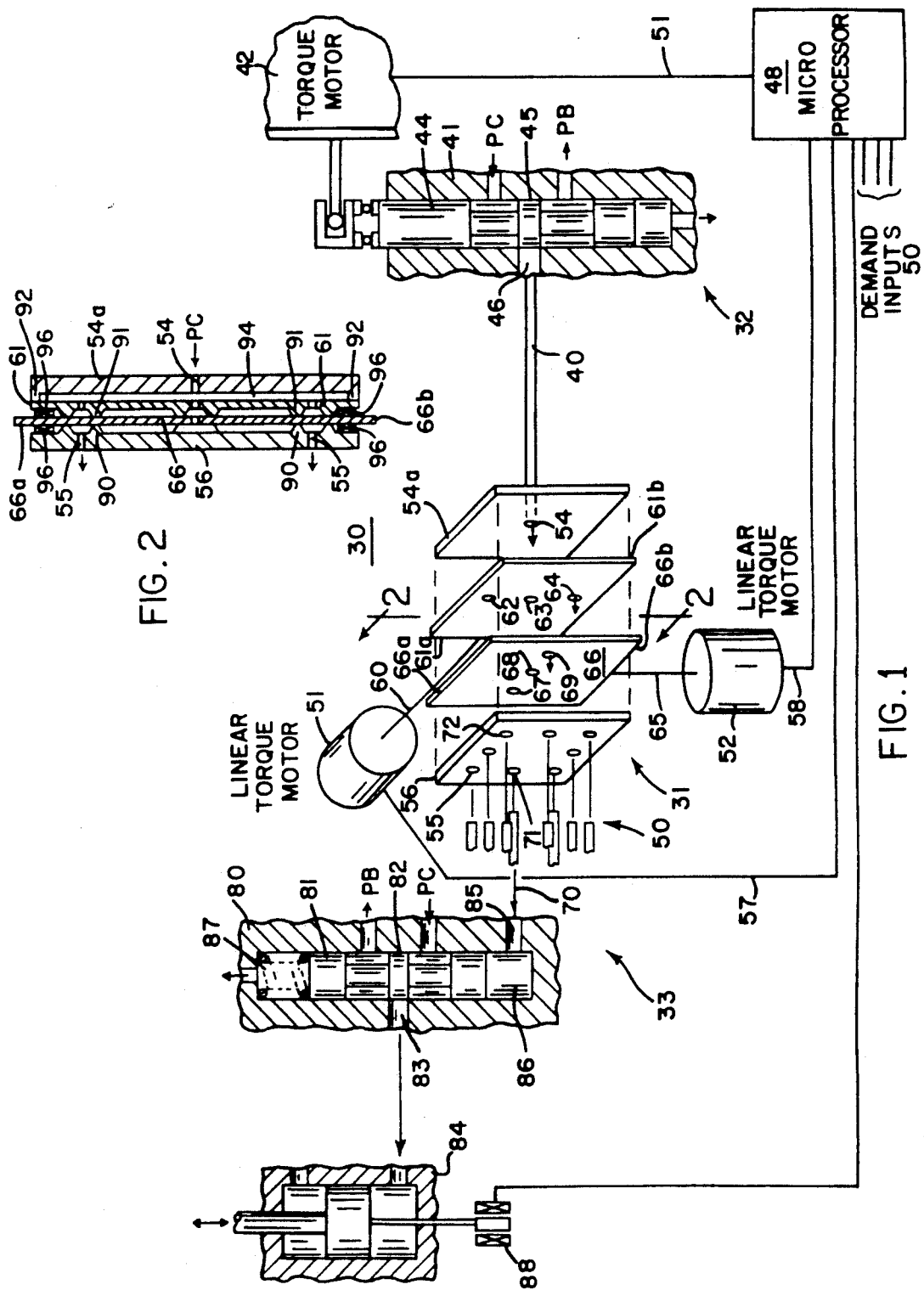

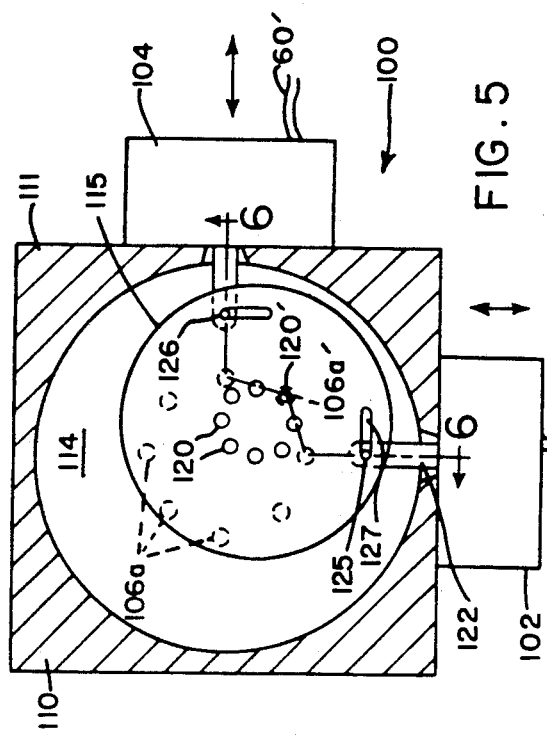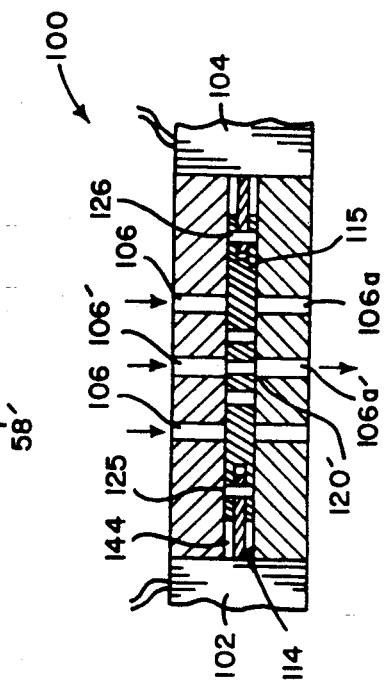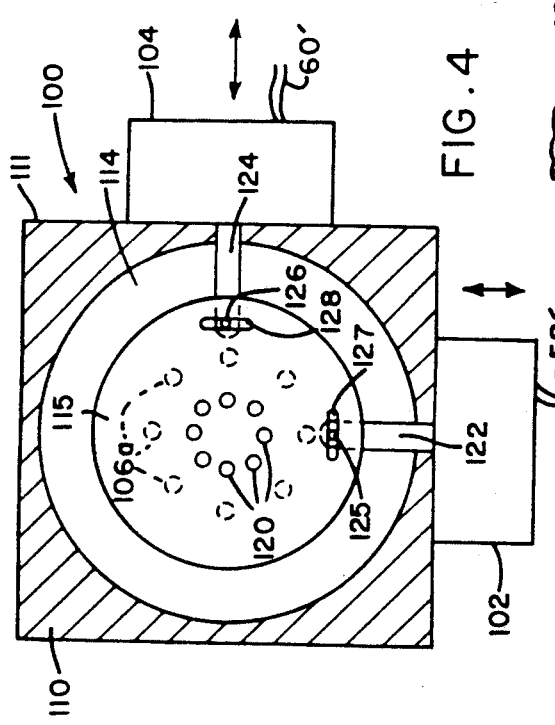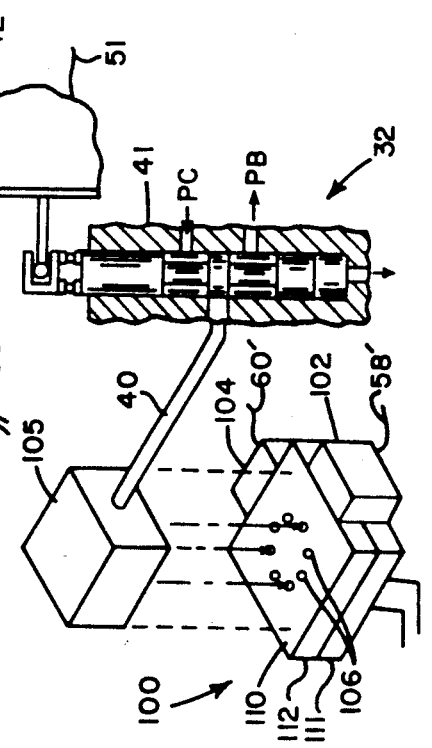

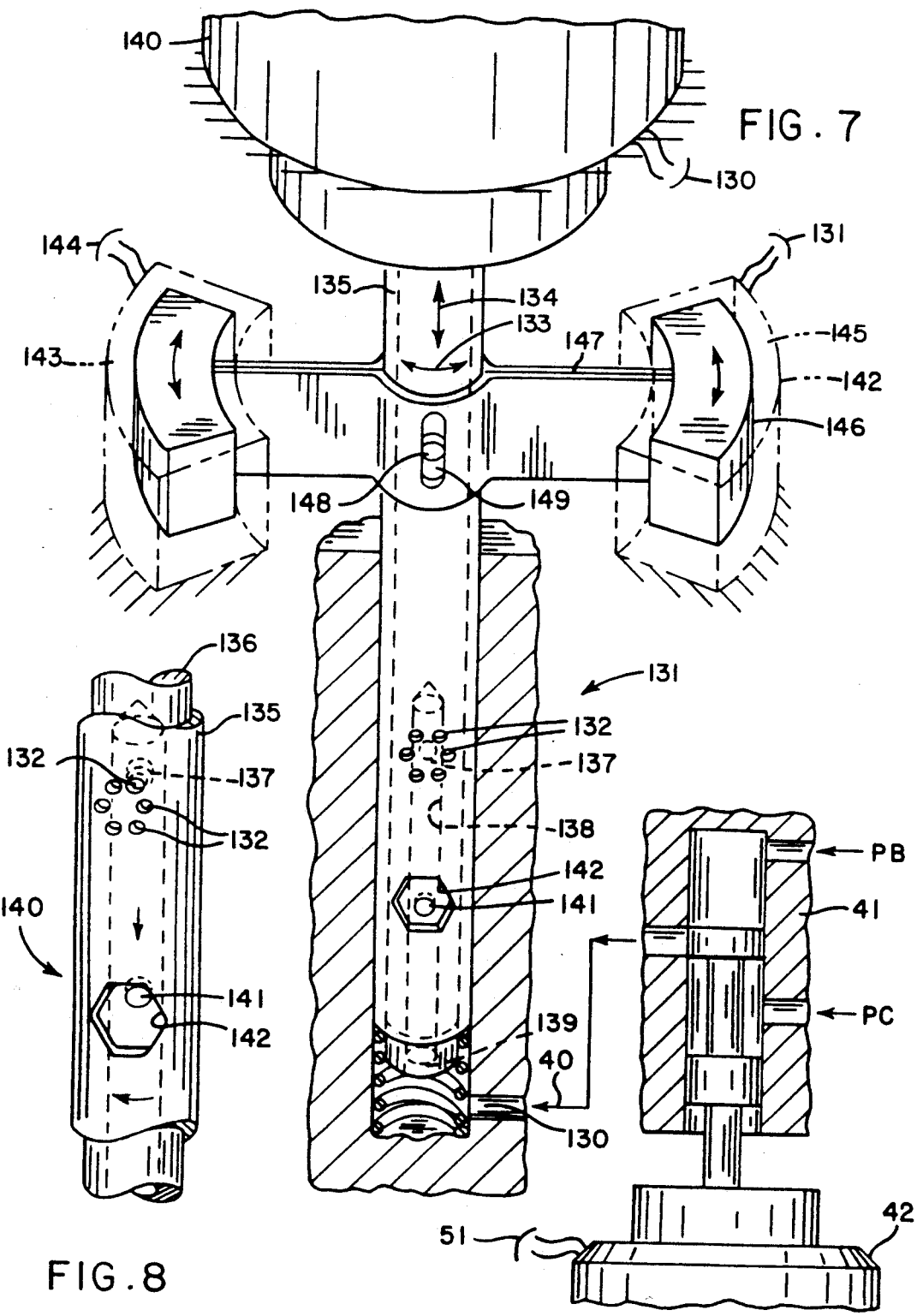

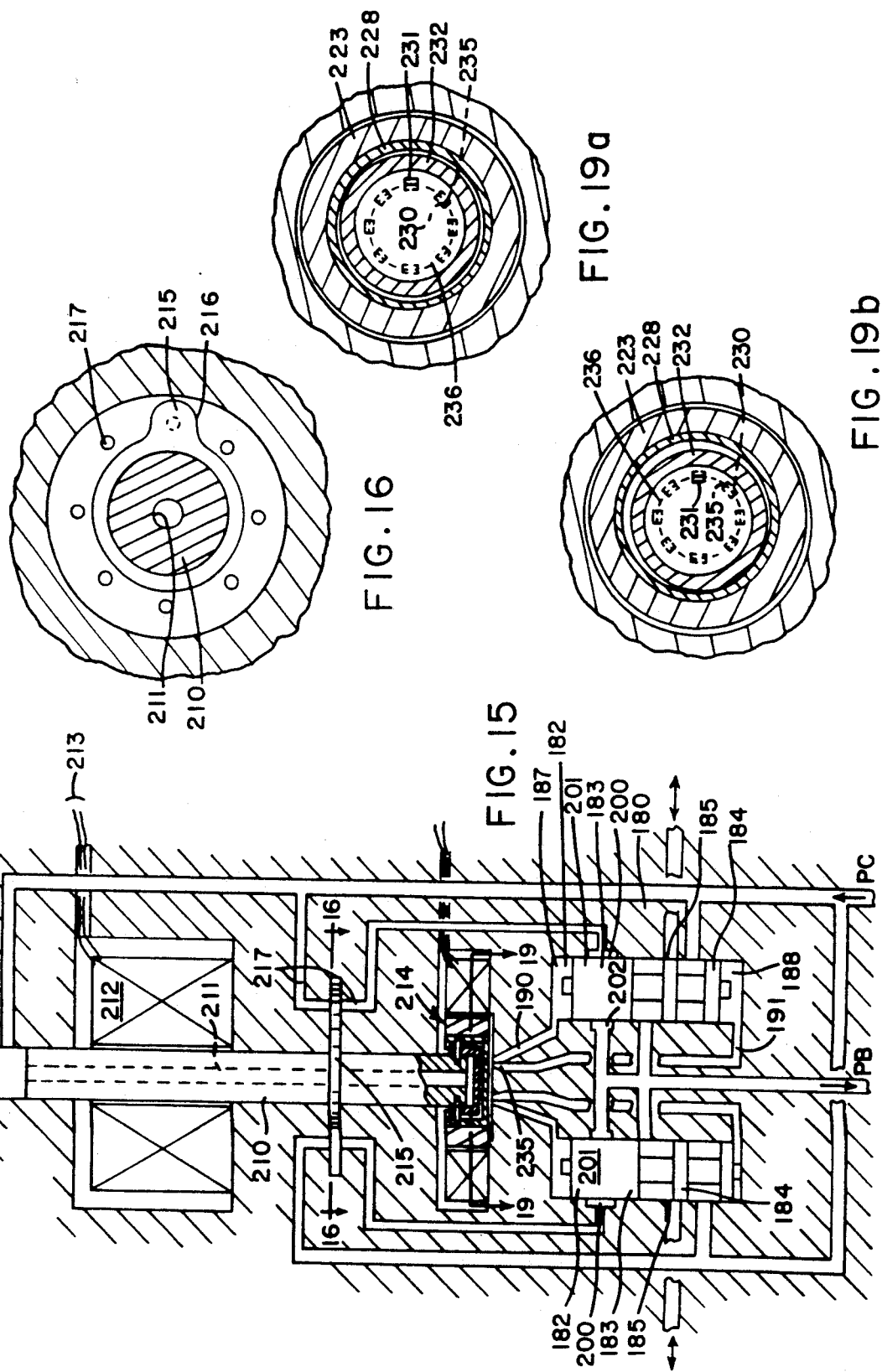

MULTIPLEXED HYDRAULIC CONTROL SYSTEM WITH MULTIPLEXING VALVE HAVING PLANAR PORT ARRAY

BACKGROUND OF THE INVENTION

1. Field of the Invention

This invention relates to hydraulic control systems, and more particularly to such systems in which a plurality of hydraulic actuators are to be precisely positioned in dependence on the magnitude of a similar plurality of electrical control signals.

2. Description of the Prior Art

There are numerous such control systems, and this invention would represent a significant advantage in connection with many of them. One exemplary and very significant application of such controls is in aircraft systems where hydraulic controls are provided for adjusting mechanical variables in jet aircraft engines. The gas turbine engines which are used to power conventional jet aircraft have commonly used hydraulic actuators for control of air valves, fuel valves, engine variable geometry, and the like. As engine designers attempt to achieve more and more performance from the gas turbine, the number of hydraulic actuators has increased significantly, and may approach 17 in number. Even gas turbine engines used on older commercial aircraft typically have on the order of six hydraulic actuators. In many cases, the actuators control functions which are critical, such as fuel supply, and on such critical functions, if control is lost, so is the engine.

Heretofore, each hydraulic actuator was provided with a device to convert an electrical input signal into a mechanical actuator position. Most typically, that had been done with a torque motor connected to and driving a hydraulic servo valve; the servo valve, in turn, controlled the supply of hydraulic fluid to the actuator. The torque motor, being dedicated to the associated actuator, could be driven for as long as additional actuator movement was desired. However, both torque motors and servo valves are fairly expensive, and both are fairly weighty components, particularly for aircraft applications where weight savings on the order of pounds can translate into substantial operating cost savings over the life of the aircraft.

Applicants are aware of a concept having been proposed to reduce weight and cost in such systems, by using a single pilot valve multiplexed among a plurality of actuators. In substance, the pilot valve has a spool which is rotated for multiplexing and which is positioned vertically by the torque motor to establish control positions. The spool and valve would be modified to provide a plurality of outlet ports at different angular positions of the spool such that the vertical control position of the valve combined with a plurality of angular multiplex positions could be used to sequentially deliver hydraulic fluid to a plurality of actuators. A position sensor on the rotary multiplexer would be used to coordinate multiplexed electrical signals for the pilot valve with the time slots of the multiplexer.

It is applicant's belief that a system of that type could not be reduced to practice for any but the most rudimentary systems because of a number of limitations, the most prominent one being the substantially reduced flow rate to any given actuator for a servo valve of any reasonable size. The flow rate reduction is a result of two factors — 1) reduced flow through a pilot valve which is configured as a multiplexer, and 2) the fact of multiplexing itself which has flow going to an actuator only during its time slot. For a three channel system, the flow rate per cycle as compared to a standard non-multiplexed pilot valve would be reduced by about a factor of about 18. Thus, while in principle the system might work in applications where speed of response and fineness of control are not important criteria, in a jet engine control, for example, the concept would not appear to be workable.

Multiplexing of hydraulic circuits is not broadly new. It can be used for example in sharing a single transducer among a number of hydraulic or pneumatic channels, such as illustrated in Moore et al. U.S. Pat. No. 3,645,141. The opportunity to share a control servo valve among multiple actuators is also suggested in the literature, but on a manually controlled rather than a simultaneous multiplexed real time basis, insofar as applicant is aware. In contrast, in a true hydraulic multiplexed signal, control is being maintained over all of the channels, while servicing those channels individually and separately, but with sufficient frequency to maintain the outputs as representative of the inputs in substantially real time.

With respect to the prior multiplexing concept, insofar as applicant is aware, it has relied on a rotary multiplexer for sequentially activating the ports in the system. While rotary multiplexing can, in principle, be built in a very reliable fashion, acceptance of the rotary mode of operation imposes a number of drawbacks. Most particularly is the fact that the sequence is fixed by virtue of the mechanical connection of the channels to the rotary multiplexer. Each channel must be serviced in its sequence whether or not the channel has a demand for motion of its associated actuator. Thus, in the event that one of the channels demands a large actuator movement whereas another channel in the system is completely quiescent, each of the channels must be serviced in their assigned sequence and for the duration of their assigned time slot, even if service for the former is inadequate and service for the latter is superfluous. In summary, it is not only impossible to alter the sequence of channels to be serviced during operation of a rotary system, but it is also not possible to alter the length of the time slot of one channel with respect to any of its neighbors. This inherent inflexibility is undesirable in certain circumstances.

SUMMARY OF THE INVENTION

In view of the foregoing, it is a general aim of the present invention to provide a practical and reliable hydraulic multiplexed control system which does not rely upon rotary commutation for multiplexing.

In that regard, it is an object of the present invention to provide a reliable highly accurate multiple channel hydraulic control system in which the control has the flexibility for activating the outlet channels in any desired sequence.

Further in that regard, it is an object to provide such a control system in which the program control has the opportunity to independently adjust dwell times for each channel according to the demands of the system.

It is a feature of the present invention that size and weight reduction are achieved in a multiple channel hydraulic control system by provision of a relatively small multiplexing valve which has output ports for servicing a multiplicity of channels, but only a single hydraulic input and a modulating electrical actuator for that single input. Positioning means associated with the input is adapted to select any of the individual outlet ports and modulating means modulates the hydraulic input in accordance with the electrical demands for that channel to provide to the selected channel a hydraulic flow which is in accordance with the control system demands.

It is an advantage of such a system that the computerized control which is charged with maintaining the position of the actuators in the channels of the hydraulic control system has the opportunity to activate the channels in any desired sequence and for any desired length of time.

It is an important feature of the present invention that selector signals are provided for controlling the multiplexer and each selector signal has a value which corresponds directly to its associated position of the multiplexer. Thus, the multiplexer can, if desired, be run randomly, and in order to randomly activate a selected port, it is simply necessary to apply the value of the electrical signal associated with that port which causes the multiplexer to position itself to activate that port.

With the random access capability thus provided by a multiplexer in accordance with the present invention, the computerized control which is typically associated with such devices has exceptional flexibility in controlling its channels. The control can be configured, for example, to access particular channels only when those channels demand service, to prioritize certain channels related to equipment whose movement is more critical than that of others, or to alter a normal pattern of port access in abnormal situations.

Other objects and advantages will become apparent from the following detailed description when taken in conjunction with the drawings, in which:

BRIEF DESCRIPTION OF THE DRAWINGS

FIG. 1 is a diagrammatic illustration of a first embodiment of a multiplexed hydraulic control system exemplifying the present invention;

FIG. 2 is a cross sectional elevation taken generally along the lines 2—2 of FIG. 1 illustrating the relationship between the stationary and rectilinearly translatable members of the multiplexing valve of FIG. 1;

FIG. 3 schematically illustrates a hydraulic multiplexed control system representing a second embodiment of the present invention including a multiplexing valve having a valve member displaceable in two rectilinear dimensions;

FIGS. 4 and 5 illustrate the valve of FIG. 3 in the rest and one of the actuated positions, respectively;

FIG. 6 is a sectional view taken along the complex line 6—6 of FIG. 5 illustrating the porting arrangement and actuator in the multiplexed valve of FIG. 5;

FIG. 7 is a diagrammatic view illustrating a hydraulic multiplexed control system representing a further embodiment of the present invention and including a multiplexing valve displaceable in two directions, one of which has a rotary component;

FIG. 8 is a partial view further illustrating the porting and port control arrangement of the multiplexing valve of FIG. 7;

FIG. 15 is a diagram illustrating a further multiplexed hydraulic control system similar to that of FIG. 13, but modified in the area of the channel selector and modulator for the signals in the respective channels;

FIG. 16 is a partial view taken along the line 16—16 of FIG. 13 showing the unlocking means for the actuated channels;

FIGS. 19a and 19b are partial sectional views showing the modulating valve in the rest position and in a position which will cause movement of the associated second stage valve, respectively;

Figure 9:
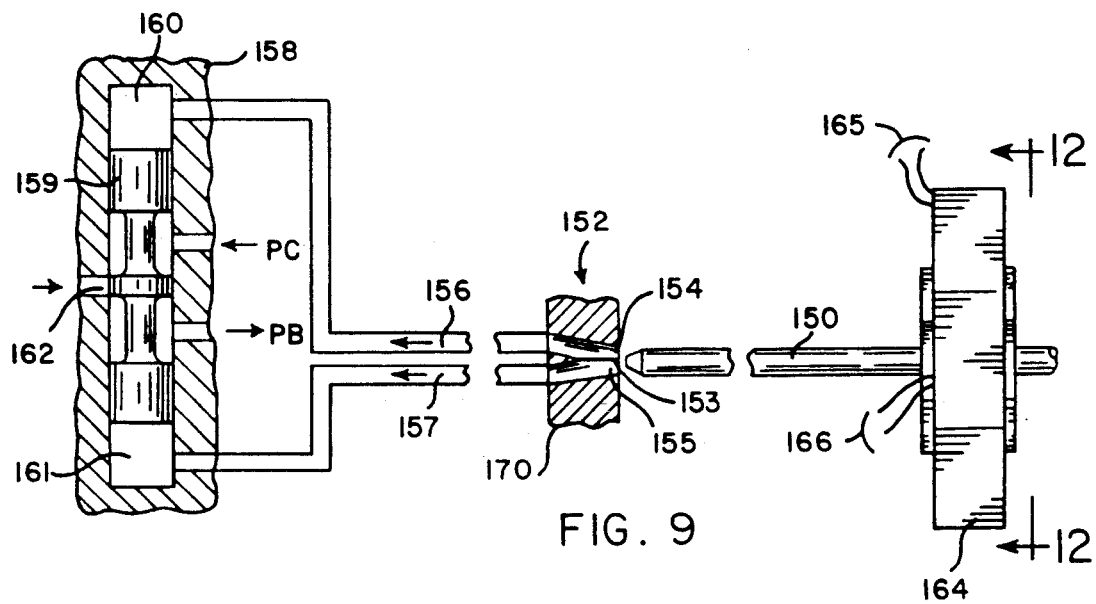
FIG. 9 is a diagrammatic view showing a further hydraulic multiplexed control system exemplifying the present invention and including a modulating means associated directly with the multiplexing selector means.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Turning now to the drawings, FIG. 1 shows a first embodiment of a multiplexed hydraulic control system exemplifying the present invention. More particularly, FIG. 1 illustrates a multiplexed hydraulic control system 30 including a multiplexing valve 31, a common source of hydraulic fluid 32 which is modulated in accordance with a plurality of electrical signals relating to the respective channels, and an outlet section 33 comprising the plurality of channels serviced within the control system 30.

In the embodiment illustrated in FIG. 1, the single hydraulic input for the multiplexing means 31 includes a hydraulic conduit 40 connected to the modulating means 32. The modulating means in the illustrated embodiment comprises a spool valve 41, which has its vertical position controlled by an electrical actuator shown herein as a torque motor 42. The valve 41 has a vertically positionable spool 44 having a land 45 thereon. The land in turn controls flow from source of hydraulic fluid PC or hydraulic sump PB to the outlet conduit 40 by way of output port 46. Thus, if the spool is raised from the illustrated position, the conduit 40 is connected to the sump PB, and the flow rate through the conduit 40 to the sump is controlled by the degree to which the spool is raised. Similarly, when the spool 44 is lowered, the land 45 opens the port 46 to the high pressure source PC, and the flow rate through the output conduit 40 is controlled by the degree to which the spool is lowered.

In practicing the invention control means, shown herein as microprocessor 48, controls the application of a sequence electrical control signals to the actuator 42, the electrical control signals being related to actuator position in each of the channels. When it is noted above that the electrical signals are in sequence, that is not intended to require that the sequence be repeating, but as will be described in greater detail below, a random sequence can also be utilized in practicing the invention.

The microprocessor 48 has a plurality of input demand signals connected to input lines schematically illustrated at 50. Typically, one of such lines within the group 50 is provided for each of the channels, and electrical signals thereon indicate to the microprocessor 48 the demanded position for each of the actuators in the system. In response, the microprocessor 48 produces signals on its output bus 51 which are coupled to the electrical actuator 42 for controlling the flow rate through the modulating valve 41, and thus the positions of the hydraulic actuators in the respective channels.

In practicing the invention, the modulated hydraulic signals produced by modulator 32 and coupled to the input hydraulic line 40 are controllably connected by multiplexing means 31 to the output channel to be controlled. Rather than utilizing a rotary multiplexer whose position is not directly selectable as described above, the present invention makes use of a multiplexer having selector means associated therewith which can respond to a plurality of selector signals to produce a particular connection between the inlet 40 and a selected one of the outlets 50 which drive to the channels 33. It is noted that the "plurality" of selector signals need not be signals which drive multiple actuators, but in some embodiments can be signals of different "values" which drive a single actuator. What is intended by the phrase "plurality" of selector signals is simply a number of signals having different values, each of which corresponds to a different connection through the multiplexing selector means. Furthermore, the term "value" is to be interpreted in its broadest sense to include not only a signal of predetermined voltage level or current level, but also a signal of a predetermined polarity or sense, so long as the multiplexing means can distinguish between such signals of different "value".

Thus, in the illustrated embodiment, a pair of linear actuators 51, 52 are provided for producing relative rectilinear motion in the multiplexer means 31 for connecting an inlet port 54 in an inlet manifold 54a, and which is one of a plurality of outlet ports 55 formed in an outlet manifold 56. While the multiplexing means 31 is illustrated only schematically, it is clear from FIG. 1 that the multiplexed actuators 51, 52 in the illustrated embodiment are three position electrical actuators having selector signals coupled thereto on lines 57, 58, respectively so that the microprocessor 48 can energize the actuators 51, 52 by means of the lines 57, 58 to select one of a predetermined plurality (in the illustrated embodiment 8) of outlet ports.

As illustrated in FIG. 1, the electrical actuator 51 serves as a horizontal positioner and has an operating arm 60 coupled to a first, horizontally positionable, sliding plate 61 having a series of three apertures 62, 63, 64 positioned therein. Similarly, actuator 52 has an operating arm 65 connected to a second, vertically positionable, selector plate 66 having a plurality of horizontally disposed apertures 67, 68, 69 formed therein. The apertures 62–64 and 67–69 are spaced in correspondence with the array of outlet ports 55 such that alignment of an aperture in the plate 61 with an aperture in the plate 66 and with an outlet port will serve to conduct fluid provided through the inlet port 52 to the selected one of the outlet ports.

In the position illustrated in FIG. 1, the central aperture 63 of the plate 61 is aligned with the central aperture 68 of the plate 66, which condition is defined as the quiescent position. In the quiescent position it is seen there is no corresponding outlet port in the outlet manifold 55, and thus no outlet fluid flow. However, if it is desired to actuate one of the outlet channels, for example the channel 70, it is simply necessary for the microprocessor 48 to couple selector signals on the lines 57, 58 which will leave the actuator 52 in its rest position, but cause the actuator 51 to draw the actuator plate 61 toward it, thereby aligning the apertures 63, 67 with the outlet port 71 associated with the channel 70. Similarly, selection of a port such as port 72 is accomplished by coupling signals to the actuators 51, 52 which will extend the actuator 51 away from its illustrated quiescent position, and extend the actuator 52 from its rest position upwardly, aligning the apertures 62, 69 with the outlet ports 72 and thereby coupling fluid which is conducted through the inlet port 54 to the channel associated with outlet port 72. It will be appreciated that the requirement of "relative motion" between inlet and outlet ports is intended to be broadly construed and to cover, for example, the embodiment of FIG. 1 where both the inlet and outlet ports are stationary but relative motion of intermediate members achieves a selective connection of those ports.

It will thus be appreciated that in order to couple sequential pulses of hydraulic fluid, or comparatively continuous streams for that matter, to any one or more of the selected channels, it is simply necessary, for each channel, to energize the actuators 51, 52 with the selector signals corresponding to the channel in question while, at the same time, coupling a signal via bus 51 to the modulating actuator 42 so that the flow of fluid through the port 54 is in accordance with the latter electrical signal and, by virtue of the selector signals is coupled through the multiplexing means 31 to the proper outlet port.

It is preferred to utilize output ports which have second stage valves in accordance with the practice described and claimed in commonly owned U.S. Pat. No. 4,984,505 entitled "Multiplexed Hydraulic Control Systems". To the extent necessary, the disclosure of this patent is incorporated herein by reference. That application describes a multiplexed hydraulic control including a second stage valve, illustrated in the present application in FIG. 1 at 70 which receives controlled fluid flow from the multiplexing valve 31 and provides both amplification of the fluid flow and a continuous flow to the associated actuator. In the FIG. 1 embodiment, the second stage valve 80 includes a spool 81 having a land 82 which controls flow through an outlet port 83 which, in turn, is connected to control fluid flow to a hydraulic actuator 84. The second stage valve is connected to a high pressure source of fluid PC and hydraulic sump PB such that movement of the spool either upwardly or downwardly causes flow between the outlet port 83 and either the sump PB or source PC, and the rate of flow is dependent upon the degree to which the port is open by raising or lowering of the spool 81. In the illustrated embodiment, the second stage valve is of the single acting variety in which an inlet port 85 receives fluid flow from the multiplexing means, and that fluid flow can be either into a chamber 86 for raising the spool or out of the chamber 86 to sump for lowering of the spool. A return spring 87 (or an intermediate fluid pressure if desired) serves to allow upward travel of the spool when fluid is forced into the chamber 86, or to force the spool downwardly when hydraulic fluid is withdrawn from the chamber 86.

As described in the aforementioned patent application, when using a second stage valve to integrate fluid flow through a multiplexing means, electrical feedback means 88 are provided which are coupled back to the microprocessor 48. Such electrical feedback means not only provides position information for comparison with the demand inputs on lines 50 so that the microprocessor can move the actuator to its demanded position, but the feedback means also supplies rate feedback (relating to actuator rate of movement) so that the control system maintains stability while utilizing two integrators in series.

Turning again to the multiplexer means 31, it was noted above that it is illustrated only schematically, since with an understanding of the principles taught herein, it will be possible for one skilled in the art to appropriately configure such a multiplexing means. However, FIG. 2 illustrates certain of the refinements which are useful in producing a multiplexing means 31. FIG. 2 shows the inlet manifold 54a and outlet manifold 56 encompassing the pair of reciprocatable plates 61, 66. As will be apparent to those skilled in the art, the unit will be sealed, preferably by confining all of the plates in slots in an appropriately machined metallic block, with the manifolds 54a, 56 being fixed and the plates 61, 66 capable of reciprocating movement within tracks in the manifold block. To that end, the plate 61 includes a pair of extensions 61a, 61b to maintain the seal between the chamber encompassed between the manifold 54a and the plate 61 even though the plate 61 is reciprocated horizontally. In that regard, it is noted that the ports 62-64 and 67-69 need be separated by only about 0.050 inches in a practical embodiment, and thus the drawing is exaggerated in order to illustrate the principles involved. In a similar fashion, the plate 66 which reciprocates in the vertical direction has a pair of extensions 66a, 66b which maintain the seal between the chambers which it separates even though the plate is raised or lowered by means of the actuator 52.

For providing a further seal, seal means are associated with the reciprocatable plates, shown in FIG. 2 as sealing elements 90 associated with the outlet manifold 56, such that one of such sealing arrangements, preferably in the form of a Gillespie seal, surrounds each of the outlet ports 55. Alternatively, the sealing member can be associated with the three apertures 67-69 in the reciprocatable plate 66. Gillespie seals, as is well known to those skilled in this art, are sliding seals which are metallic in nature adapted to confine flow within the seal, with the metallic elements allowing a certain amount of sliding friction without excessive wear of the seal.

In a similar fashion, Gillespie seals 91 are associated with the three apertures 62-64 of the horizontal plate 61. A seal 92 is provided at the exterior of the inlet manifold 54a to provide a common chamber 94 for receiving fluid from the inlet port 54, such that the fluid which is passed from the modulated source is available in the chamber 94 for passing through any two aligned apertures to the associated outlet port. The Gillespie seals 91 assure that two of the apertures within the group 62-64 are sealed, whereas only the aperture within that group which is common with an aperture 67-69 in the horizontal sliding plate 66 is allowed to pass fluid to the associated outlet port.

Bearings 96 positioned between the sliding plates as illustrated in FIG. 2, reduce friction and provide a predetermined spacing for the plates as they are reciprocated, which elements cooperate with the grooves in the manifold block (not shown) which also serve to confine and guide the sliding plates while hydraulically sealing the arrangement.

Appreciating that the spacing between outlet ports can be as small as noted above, i.e., on the order of 0.050 inches, it will be appreciated that the multiplexing means 31 can be miniaturized, can be driven by relatively small, light and low power electrical actuators 51, 52 and can be very rapidly positioned to select whichever of the outlet ports within the array 55 is desired by the microprocessor 48. Selection can be accomplished as quickly as repositioning the spool 44 within the modulating valve 41 so that whenever the processor 48 decides to alter the flow rate in a given channel, it simply need couple the selector and modulator signals onto the lines 51, 57, 58 to cause immediate selection of the channel in question and modulation of the flow to that channel without the necessity for completing a revolution or a portion of a revolution of a rotary multiplexer.

Turning now to FIGS. 3-6, there is shown a second embodiment of a multiplexed hydraulic control system including an alternative multiplexing means which is similar to that of FIG. 1 in that it includes a planar two-dimensional array of outlet ports individually selected by rectilinear motion, but differs in the manner of achieving relative motion between the single inlet and multiple outlet ports. In the FIG. 3 embodiment, like FIG. 1, there is a single source 32 of hydraulic fluid coupled by conduit 40 to multiplexing means generally indicated at 100. The source of hydraulic fluid 32, as in the FIG. 1 embodiment, includes a spool valve 41 which in turn is controlled by a torque motor 42 having electrical signals passed thereto on a line 51. A microprocessor (not shown but configured as illustrated in FIG. 1) imposes signals on the line 51 for controlling the torque motor 42 to produce modulated hydraulic flow in the conduit 40 in accordance with that demanded by one of the plurality of output channels generally indicated at 101. As in the prior embodiment, in addition to imposing a modulation signal on the line 51 relating to fluid flow rate for a particular channel, the microprocessor also controls a pair of rectilinear positioning solenoids 102, 104 which serve to connect the input on line 40 to one of the outputs 101.

The FIG. 3 implementation illustrates the use of a single manifold 105 connected to the conduit 40 for supplying a plurality of distributed input ports 106. As will be described below, the ports are opened selectively and individually such that fluid passed through the conduit 40 into the manifold 105, is passed through only one of the ports 106 at a time for passage to the channel selected by the microprocessor acting on the positioning solenoids 102, 104.

FIGS. 4-6 illustrate the multiplexing means 100 in greater detail. First of all, however, as suggested in FIG. 3, the multiplexing means 100 includes a valve body 110 which is typically comprised of a lower section 111 and an upper section 112. FIGS. 4 and 5 show the valve with the upper section 112 removed. One of the sections, preferably the lower section 111, has a flange for creating an internal cavity 114 for receipt of a sliding disk valve member 115. As seen in FIG. 6, the sliding disk 115 fits closely within the chamber 114 so that it can be reciprocated by the pair of rectilinearly opposed solenoids 102, 104.

The upper member 112 of the valve body and the lower member 111 of the valve body have registered ports therein 106, 106a, respectively, and in the normal position illustrated in FIG. 4, none of the inlet ports 106 is connected to its associated output port 106a because a solid portion of the intermediate disk 115 is interposed between the inlet and outlet ports. The valve disk, however, has an array of ports 120 formed therein, and when one of such ports is registered intermediate an inlet port 106 and an outlet port 106a, communication between those ports is allowed. That condition is illustrated in FIG. 5 which shows the disk 115 translated to the right and downwardly so that the port 120' in the valve member is registered with the inlet port 106' and the outlet port 106a', allowing fluid which is conducted to the manifold 105 to pass through the port 106' to the outlet port 106a'. The connection between ports 106' and 106a' is best illustrated in FIG. 6. In the condition illustrated in FIGS. 5 and 6, it will be apparent that only the outlet port 106a' is activated, since the array of ports 120 is not registered with any other inlet/outlet combination, maintaining the closed relationship of the remaining ports. Thus, the multiplex arrangement of FIGS. 3-6 serves to selectively and individually energize selected ones of the outlet ports to pass fluid from the common inlet to the selected outlet.

Referring in greater detail to the relationship between the solenoids 102, 104 and the valve disk 115, it is seen that the solenoids include solenoid actuators 122, 124 which are connected by means of pins 125, 126 into slots 127, 128 formed in the valve disk 115. The solenoids 102, 104 are three position solenoids with FIG. 4 illustrating the intermediate quiescent position and FIG. 5 illustrating the retracted position of both solenoids. In the advanced position, both the actuators 122, 124 would extend from the solenoid forcing the valve disk to the left (as illustrated in FIG. 4) for the solenoid 104 and upwardly for the solenoid 102.

It will be appreciated that with the illustrated arrangement, linkage means including pins 125, 126 engaged in slots 127, 128 allow the disk to move in diagonal directions with respect to the rectilinear arrangement of the solenoids. Thus, eight multiplex positions are available in the illustrated embodiment along with a central non-activated position. As a result, when both of the solenoids are activated to the retract position, the condition of FIG. 5 is achieved in which the lower right outlet port is activated. If only the solenoid 104 had been activated in the retract mode, and the solenoid 102 allowed to remain in the de-energized mode, the right-hand port would have been activated. It will now be apparent that for the various three conditions of the selector solenoids, the eight outlet positions can be individually selected in dependence upon the "levels" of the electrical signals passed in combination to the pair of solenoids 102, 104.

The single manifold 105 connected by way of individual conduits to the inlet ports 106 is worthy of note, and can also be applied to the arrangement of FIG. 1 if desired. Such an arrangement lessens the hydraulic force applied to the upper side of the disk 115. Indeed, the hydraulic force applied to the upper side can be balanced by branching each of the inlet connectors off to the underside of the disk as well so that the disk can be maintained in a hydraulically floating condition for ease of movement by relatively small and low powered solenoids 102, 104. As in the case of FIG. 1, the valve is illustrated much larger than would be necessary in actual construction, it being necessary to reciprocate the valve approximately plus or minus 0.050 inches in the rectilinear directions to achieve the multiplexing selection desired. In addition, as a further variation, the circular array of ports 120 can be dispensed with in favor of a single central port 120, and the inlet and outlet ports can be arranged in a circle of smaller diameter accessible by a single connecting port 120 in place of the array of connecting ports 120 in the FIG. 4 embodiment.

The embodiments thus far described in detail include a two-dimensional planar array of outlet ports and selector means for causing relative movement to connect a single inlet to individual ones of that planar array. A further embodiment of the invention, illustrated in connection with FIGS. 7 and 8, demonstrates that the array of outlet ports need not be planar in order to achieve the objective the invention relating to provision of electrical selector means for operating the multiplexer in which the value of the electrical signal corresponds to a particular position of the multiplexer. As noted above, among the important advantages of such a system are the possibility of random selection of the ports in any order or a changing order, and the opportunity to adjust the dwell time of one port with respect to others, all under the control of the operating processor.

Turning now to FIG. 7, there is shown an electrical actuator 42 having input connections 51 for receiving from the processor the individual signals related to the desired actuator travel in the respective channels. In the illustrated embodiment, the electrical actuator 42 is shown as a voice coil rather than a torque motor, but it is to be understood that it is within the skill of the art to select one of the actuator types available for driving a spool valve in dependence upon the requirements of the system. Voice coils are preferred in many systems because of their low inertia, and low inductance to yield a high speed system. When such high speed low inertia actuators are used in connection with the multiplexer, it is usually preferable to utilize a similar voice coil actuator for the modulator.

In any event, the electrical actuator 42, responding to signals from the processor on line 51 controls the modulating valve 41 to produce a modulated hydraulic signal which is coupled by a schematically illustrated line 40 to an input port 130 of multiplexing means generally illustrated at 131. In the illustrated embodiment, the multiplexing means includes an array of outlet ports generally illustrated at 132 and selector means positionable under the control of electrical signals in two dimensions, a first rotary dimension suggested by arcuate arrow 133 and a second vertical reciprocating dimension suggested by arrow 134.

The multiplexing means is based on a pair of concentric hollow tubes, an outer tube 135 (see Figs. 7 and 8) which contains the outlet porting arrangement 132, and an inner tube 136 which contains a central jet 137. The inner cylindrical tube is affixed to an electrically operated linear actuator 140, and the outer tube 135 connected to the movable diaphragm of the electrical actuator 140 so that imposition of an electrical signal on the inlet line 130 will cause the actuator 140 to reciprocate the outer tube 135 with respect to the inner tube 136.

As noted above, the inner tube 136 is hollow (or has an aperture 138 as illustrated in FIG. 8 formed therein so that the lower end 139 of the tube communicates with the jet 137. It is therefore seen that flow from the modulating valve 41 through the conduit 40 passes into the inner tube and is available at the jet 137 for coupling to a selected one of the output channels in dependence upon the position of the multiplexing means. Thus, if the multiplexing means is adjusted to make the outlet jet 137 congruent with one of the outlet ports 132, fluid will flow to the channel associated with that outlet port.

For purposes of controlling the multiplexer, in addition to the linear electrical actuator 140, a rotary actuator 142 is provided for rotating the tube a controlled distance about its vertical axis. A second rotary solenoid 143 is provided simply to balance the original solenoid 142 and, while it has a coil and electrical connections 144, in the normal course those are not utilized. As an alternative, the coils of the rotary torquers 142, 143 can be connected in parallel by appropriately phasing the connections to the windings 131, 144.

Focusing on the rotary solenoid 142, it is seen that a coil generally illustrated at 145 has signal supplied thereto on the lines 131 and will drive a central floating diaphragm 146 in one direction or the other depending upon signal level, i.e., the magnitude and polarity of the signals applied on lines 131. The diaphragm 146 in turn is connected by means of vanes 147 to the periphery of the outer sleeve 135. It is seen that a pin 148 inserted in the outer sleeve 135 rides within a slot 149 in the vane type arrangement 147 so that the outer sleeve 135 can freely reciprocate in the vertical direction. In addition, by means of the engagement between the pin 148 and slot 149, when the rotary solenoid 142 is actuated, the vanes will cause the pivoting of the outer tube 135 about its vertical axis, thereby providing the opportunity to adjust the outlet port array 132 in two dimensions with respect to the central stationary jet 137.

In order to provide a mechanical stop which defines the activated positions for the multiplexing means 131 in which the jet 137 is associated with a respective one of the outlets ports 132, detent means 140 is provided, and is associated with the inner and outer tubes 136, 135, respectively. It is seen that the illustrated detent means includes a pin 141 affixed to the central tube 136 and an aperture 142 corresponding to the port array 132 which surrounds the pin 141. It is therefore seen that reciprocation or rotation of the outer sleeve 135 is limited by the engagement of the pin 141 with the periphery of the aperture 142 in the outer sleeve. Thus, as illustrated for example in FIG. 8, when the linear actuator 140 is energized to move the outer sleeve downward, and the rotary actuator 142 energized to rotate the outer sleeve clockwise (as illustrated by the arrows in FIG. 8), the pin 141 will allow the outer sleeve to move until the pin engages the upper right-hand corner of the aperture 142. The aperture is so shaped that in the engaged illustrated position, the output jet 137 is registered with the outlet port 132' which is in the upper right-hand corner of the outlet port array. It will now be apparent that each of the ports in the array 132 can be selected by energizing the actuators 140, 142 in either the positive, negative or de-energized condition to individually select ports within the array 132.

The mechanical detent arrangement 140 is worthy of note in that the present invention provides that the outlet ports are related to the "levels" of the input selector signals. Such a requirement is not necessarily restricted to the narrowest sense of that term in which the voltage or current level of a signal relates directly to a position, but also encompasses an arrangement such as that illustrated in FIG. 8 where the sense of a signal (say positive or negative) drives an actuator in a particular direction, and a mechanical stop, rather than the absolute signal level, establishes the identity of the selected port.

In any event, as in the prior illustrated embodiments, selector signals applied to the actuators 140, 142 on the input lines 130, 131 from the central processor (not shown in FIG. 7) causes the selection of one of the plurality of channels by means of selecting one of the plurality of outlet ports 132 while, at the same time, the processor controls the modulator 41 by means of signals on the input lines 51 to cause a modulated flow to the selected channel for controlling the position of the actuator in such channel. Like the other embodiments, the embodiment of FIGS. 7 and 8 allows random selection and adjustment of dwell time under the control of the processor. It is also noted that like the other embodiments, the system of FIG. 7 preferably has the outlet ports 132 connected to respective ones of associated second stage valves which provide continuous flow and hydraulic amplification to control the position of coupled hydraulic actuators. Like the FIG. 1 embodiment, that system includes feedback means on the actuator which provides both position and rate feedback to the controller for establishing overall position control as well as maintaining system stability.

In the prior embodiments, the means for modulating the hydraulic flow and the means for multiplexing the modulated flow comprised separate elements responsive to separate electrical actuators. It is also possible to produce a system in which the modulation and multiplexing selection are accomplished by common elements. One means of combining the multiplexing selection and modulating features is by use of a modulated jet pipe arrangement constructed in accordance with the invention as schematically illustrated in FIG. 9.

FIG. 9 illustrates the principle of a jet pipe and its use in a hydraulic multiplexed control system. The system includes an elongate deflectible tube 150 fixed at one end and supplied at one end with high pressure hydraulic fluid from the source PC and, at the other end, having a nozzle 151 for high pressure, highly directed fluid flow. Positioned opposite the nozzle is a receiver 152 having a central separator 153 dividing a pair of receiver channels 154, 155. It is seen that the receiver channels 154, 155 are connected to respective conduits 156, 157 and thence to opposite ends of a second stage valve 158. The second stage valve 158 has a spool 159 which is driven upwardly or downwardly dependent upon which of the chambers 160, 161 has a higher pressure, and driving the spool upwardly or downwardly controls the opening of an outlet port 162 which is connected to the actuator in the channel associated with the second stage valve 158. With the jet pipe in the central illustrated position, flow out of the jet orifice 151 divides evenly between the receivers 152, causing an equal pressure in the chambers 160, 161 and leaving the spool in the last adjusted position. A torquer 164 is provided for deflecting the tube 150, and has a pair of input signal leads 165, 166 in the illustrated embodiment. When signals are applied to the leads 165, 166, the jet pipe is deflected in a predetermined direction. In the fragmentary view of FIG. 9, the control direction is upwardly or downwardly which will cause an uneven split between the paired receivers 154, 155, thereby causing a pressure differential between the chambers 160, 161. Assuming, for example, that application of electrical signals on lines 165, 166 causes the jet pipe to be deflected upwardly, the pressure in the chamber 160 will be greater than that in the chamber 161, driving the spool downwardly and further opening the outlet port 162 to the high pressure source PC.

Figures 10, 11:
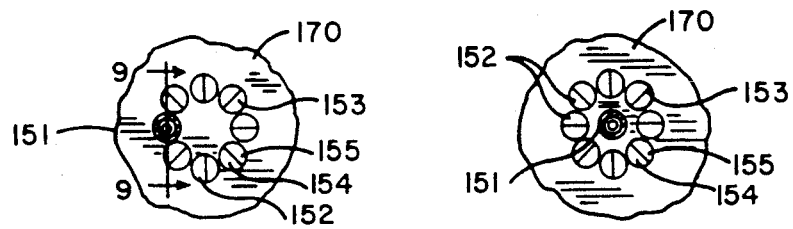
FIGS. 10 and 11 are diagrammatic views illustrating the array of outlet ports for the multiplexing valve of FIG. 9 in the actuated and deactuated positions, respectively.

In practicing the invention, a jet pipe as illustrated in FIG. 9 is multiplexed among a plurality of receiver pairs such as the pair 152 illustrated in FIG. 9. More particularly, the receiver pair 152 is formed in a base plate 170 which includes a plurality of additional receiver pairs as illustrated in FIGS. 10 and 11. In the illustrated embodiment, the receivers 152 are arranged in a circular array, and the separators 153 which separate individual receivers within a pair are arranged in a radial direction such that the nozzle 151 of the jet pipe can approach a particular receiver along a radius, in the initial instance without altering the split between the receivers in a pair. However, a modulating signal is then applied to the torquer 164 which will cause the jet pipe to reposition slightly with respect to the separator 153, thereby modulating the fluid flow to the associated second stage valve and causing motion in one direction or the other. Following the adjustment of the channel in question, the jet pipe can then be returned to its central position illustrated in FIG. 11 then deflected along a radius to another receiver pair, whereupon the jet pipe is slightly repositioned for modulation and readjustment of the flow in that channel. FIG. 10 illustrates the nozzle 151 of the jet pipe having selected the leftmost pair of receivers by virtue of signals applied to the lines 165, 166 of the torquer 164, whereupon those signals are then modified to slightly reposition the jet pipe and cause modulated flow to the upper or lower chamber of the associated second stage valve for adjusting flow in that channel.

Figure 12:
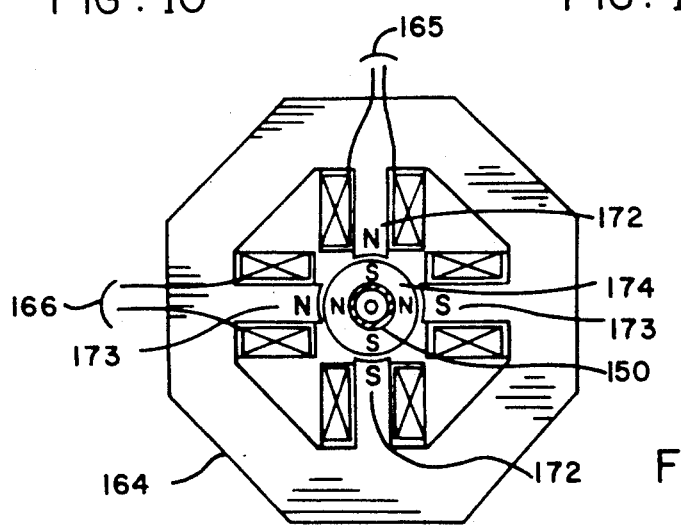
FIG. 12 is a view taken along the line 12—12 of FIGS. 9 and 13 showing a two axis electrically actuated jet pipe displacement means for controlling both the selection and modulation of the multiplexed control of FIGS. 9 and 13.

As an example of a two-axis torquer for deflecting the jet pipe of FIG. 9, FIG. 12 shows a magnetic torquer having two sets of poles 172, 173 disposed at right angles with respect to each other. The poles interact with a magnet 174 positioned on the jet tube within the torquer 164, and having alternating north-south poles as illustrated in FIG. 12. Preferably, the magnet is of high energy density such as a samarium cobalt magnet. The poles 172, 173 can be energized in the north-south configuration as illustrated in FIG. 12 or individually in the opposite condition to control the deflection of the jet pipe either toward or away from the poles or along diagonals between the poles, depending upon the combination of energizing signals. When the poles 172, 173 are energized to produce the north-south configuration illustrated in FIG. 12, it will be apparent that the samarium cobalt magnet 174 (and the jet pipe on which it rides) will be deflected toward the upper right along a diagonal between the upper north pole 172 and the right-hand south pole 173.

It will thus be apparent that simply controlling the polarity and magnitude of the signals applied to the pole pairs 172, 173 will cause the deflection of the jet pipe in a selected one of eight directions, thereby individually selecting among the eight pairs of receivers illustrated in FIG. 9. After selection, a further modulation of the signal applied to the poles will cause the slight deflection of the jet pipe between the receivers in a pair to modulate the signal and thereupon readjust the second stage valve in the selected channel. In a jet pipe arrangement such as that illustrated in FIG. 9, it is necessary to utilize second stage valves which are constructed with sufficient friction so that they remain fixed in the steady state and only alter their position when fluid having a differential pressure is applied to the associated receiver pair. As will be demonstrated below, in connection with subsequent embodiments, the second stage valve retaining friction can be made selectable for provision of locking means for maintaining the second stage in its then-adjusted position after an adjustment is completed, and releasing of the locking means only when the multiplexing means again selects that channel for further adjustment. However, in the FIG. 9 embodiment, for the sake of clarity in simply introducing the concept, the selectable locking means is not included.

Figure 13:
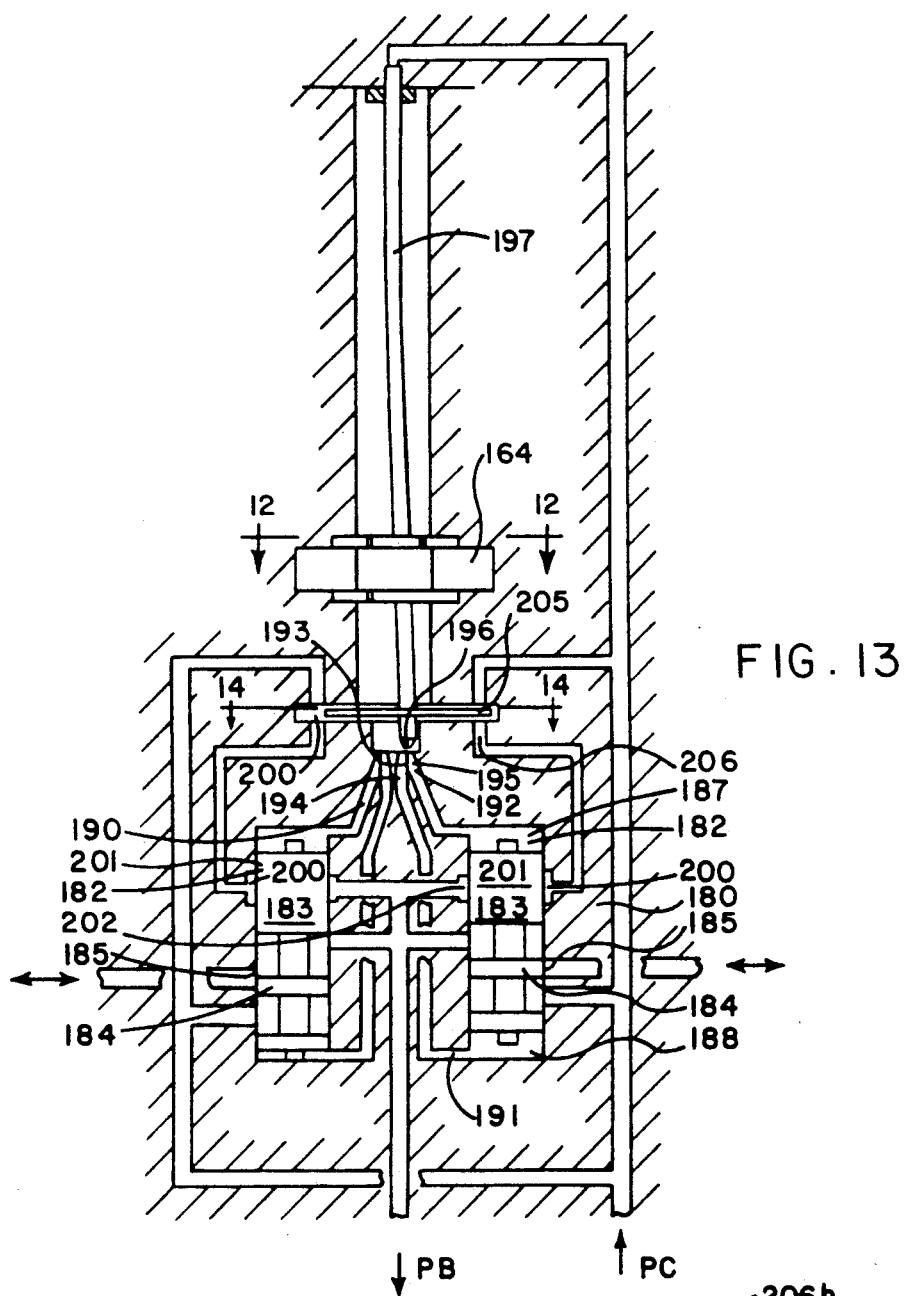
FIG. 13 is a diagram showing a multiplexed hydraulic control system representing a further embodiment of the present invention and including a jet pipe multiplexed among a plurality of receivers.

FIG. 13 illustrates an alternative jet pipe embodiment in which the jet pipe selects among receiver pairs by nutating in a circle of predetermined radius, with modulation being accomplished by slight deflection of the jet pipe along the radius. The multiplexed hydraulic control system of FIG. 13 is configured with common electrical means for both multiplexing selection and modulation, and additionally has the second stage valves for each of the channels mounted in the same valve body as the multiplexing and modulation means. To that end, a valve body generally indicated at 180 includes a circular array of second stage valve cylinders 182, two of which are shown in FIG. 13. Within each of the second stage valve cylinders is arranged a spool 183 for reciprocation in the vertical direction, the spool having a metering land 184 controlling flow through an outlet port 185. As illustrated in FIG. 13, the rightmost second stage valve has the outlet port 185 completely closed, whereas the leftmost second stage valve has the outlet port 185 partially opened to sump.

As in the FIG. 9 embodiment, each second stage valve has a pair of opposed chambers 187, 188 connected by means of conduits 190, 191 to a paired receiver generally indicated at 192. The receiver includes a central divider 193 providing a pair of separate receiver elements 194, 195 disposed to cooperate with a jet 196 of a jet pipe 197. As in the FIG. 9 embodiment, deflection of the jet pipe on either side of the central divider 193 causes a pressure differential within the chambers 187, 188 to move the second stage spool either upwardly or downwardly, thereby changing the flow rate through the outlet port 185.

Figure 14A:
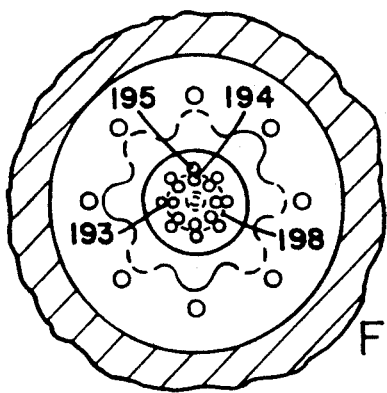
FIGS. 14a and 14b are partial views taken along the line 14—14 of FIG. 13 showing the porting arrangement of the receivers and associated unlocking hydraulic ports.

Referring briefly to FIG. 14a, it is seen that the paired receivers 194, 195 are arranged so that the separator 193 which divides the receivers is in the circumferential direction (rather than in the radial direction as illustrated in FIG. 9). As shown in FIG. 13a, the paired receivers are formed in a circular array, and an imaginary circle 198 which connects all of the dividers represents a null position for the jet pipe 197. When none of the receivers are to be serviced, the system is operated to simply nutate the jet pipe such that the jet 195 describes the imaginary circle illustrated at 198 and thus does not alter the position of any of the second stage valves. However, when it is desired to change the flow rate in one of the channels, when the jet pipe approaches the receiver pair for the channel in question, the electrical signals which cause the nutation are modified to cause the jet 195 to deviate slightly from the circular path 198, either toward or away from the center of the circle, thereby causing a differential split in hydraulic flow (from the source PC through the jet 196) into the receiver pair, resulting in movement of the associated second stage valve either upwardly or downwardly, depending on the direction of jet pipe deflection. As in the FIG. 9 embodiment, the jet pipe is deflected by means of a two-axis torquer 164 which has pairs of opposed coils as illustrated in FIG. 12 to receive signals which relate not only to the selection of a particular channel, but also to the flow modulation to be applied to that channel.

In addition to the selection and modulation functions just described, the system of FIG. 13 includes locking means for the second stage valves and means associated with the selection means for unlocking the valve associated with the channel then being addressed. To that end, the high pressure source, in addition to being connected to the inlet of the jet pipe (as described above), is also connected to a partially cylindrical port 200 which extends over somewhat less than half the circumference of the piston portion 201 of the spool. Somewhat less than another half of the piston 201 is engaged with a further semicircular channel 202 which in turn is connected to the hydraulic sump PB. Referring to the left-hand second stage valve of FIG. 13, it is seen that the high pressure source is coupled through an uninterrupted connection 204 so that the high pressure is applied to the side of the piston 201 via the channel 200. Thus, with full hydraulic pressure clamped to one side of the piston and the sump to the other, the piston is locked in the previously adjusted position and cannot move until unlocked.

The ability to selectively lock the second stage cylinders as illustrated in connection with the FIG. 13 embodiment is useful not only with jet pipe arrangements as described herein, but with hydraulically multiplexed systems using second stage valves generally. The opportunity to actually lock the second stage valve while other valves are being serviced will provide in many cases an extra degree of precision in assuring that the flow rate set during the time slot associated with the channel is maintained until the control system returns to again service that channel. The locking mechanism disclosed herein will be referred to as a side load locking mechanism. That side loading in this context is intended to refer to a load placed on the second stage spool which is other than axial (the operating direction of the spool), and while the side load is conveniently at right angles to the axial direction of travel, a solely perpendicular force is not required.

In practicing the invention, means are provided for unlocking the piston when the associated receiver pair is selected. Such means are illustrated in connection with the right-hand second stage cylinder in which selectable interrupter means 205, connected to and thereby associated with the jet pipe 197 has interrupted the fluid path 206 between the high pressure source PC and the chamber 200. As a result, the high pressure on the side of the piston 201 is relieved, and the second stage valve is unlocked so that it can respond to differential fluid flow through the jet pipe pair 193, 194.

Figure 14B:
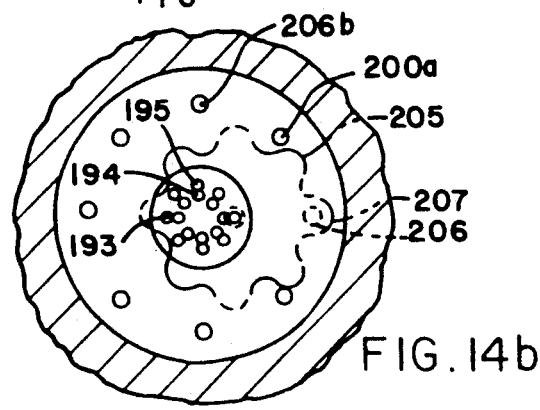

The configuration of the unlocking means is best illustrated with reference to FIG. 14b, which shows the unlocking means 205 as a solid interrupter or mask having a plurality of fingers 207 (eight in the illustrated embodiment). The mask 205 has a central portion affixed to the jet pipe so that when the jet pipe is deflected, one of the fingers 207 interrupts the passage 206, thereby unlocking the associated second stage valve. FIG. 14b illustrates the jet 195 of the jet pipe associated with the paired receivers 193, 194 while the finger 207 has interrupted the passage 206 to unlock the right-hand second stage valve. Thus, the second stage valve is allowed to move by virtue of its being unlocked, and is forced to move in a predetermined direction by means of the modulating signal applied to the jet pipe, deflecting it to the right of the neutral circle 198 as illustrated in FIG. 14b. It will be apparent from the illustration of FIG. 14b that as the jet pipe nutates on or near its circular path 198, alternate fingers 207 serve to interrupt additional passages 206a, 206b to sequentially unlock the second stage valves which are arranged in a cylinder in the valve body 180.

In utilizing the embodiment illustrated in FIG. 13, it is preferable to adjust the resonant frequency of the jet pipe 197 so that nutation around the circle 198 is at a frequency which corresponds to the natural frequency of the jet pipe, thereby requiring minimum electrical input for selecting the channels. However, the FIG. 13 embodiment suffers from the disadvantage that it is preferably operated in a sequential mode, and it is difficult to adjust the dwell time from one channel to the next. That is possible, of course, if signals are applied to the torquer 164 to bring the jet pipe to the neutral circle 198 between a pair of receivers, then to index the jet pipe along the neutral circle to a particular pair of receivers, then to again alter the position of the jet pipe to modulate the flow between the receivers in a pair. That is, of course, possible because the embodiment of FIG. 13 does have electrical signals whose levels correspond to positions in the array, although such operation is somewhat more cumbersome with the embodiment of FIG. 13.

FIG. 15 shows a further embodiment of the invention which is similar to the FIG. 13 embodiment in that it utilizes an array of receivers responsive to a single jet pipe, and locking means for a circular array of second stage valves, but differs in that the deflection of the jet pipe is eliminated, and the modulation and multiplex selection signals are separated. Referring to FIG. 15, it is seen that the second stage arrangement within the valve body is the same as that described in connection with FIG. 13, and the same reference numerals are utilized. However, referring now to the jet pipe arrangement, it is seen that there is provided a rather large diameter rotary shaft 210 having a central bore 211 which serves as a passage for high pressure fluid PC. The shaft in turn forms a rotor for a stepping motor 212 having input leads 213 coupled to the microprocessor (not shown) which causes the stepping motor 212 to rotate the shaft 210 in steps to any of a plurality of desired positions for selection among the ports in the circular array. As a result, no deflection of the shaft 210 is necessary, and distribution means generally indicated at 214 is utilized to select among the pairs of ports generally illustrated in FIG. 19a. In addition, the unlocking means of the FIG. 15 embodiment is altered in that an unlocking member 215 (FIG. 16) is provided having a single finger 216 which when rotated interrupts paired ports 217 which in the normal condition serve to apply high pressure to the side of the associated second stage valve piston, but when unlocked when interrupted by the finger 216 release such pressure so that differential flow through the associated receiver pair can alter the position of the second stage valve.

Figure 17:
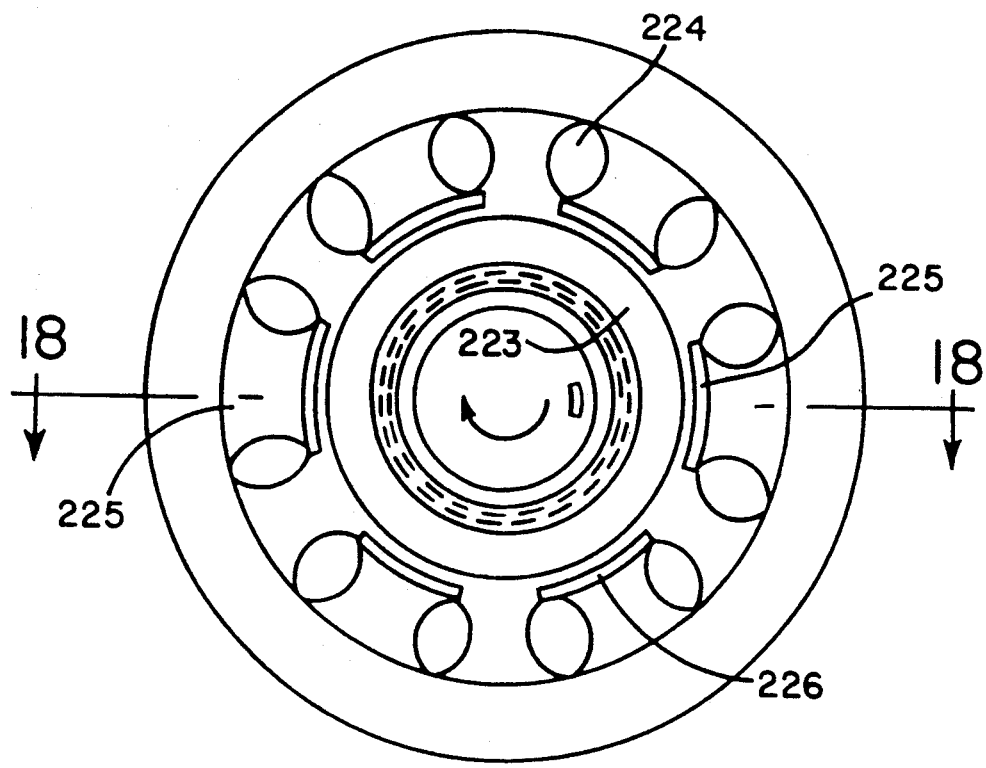
FIG. 17 is a sectional view taken along the line 19—19 of FIG. 15 showing the electromechanical selector and modulator valving elements.
Figure 18:
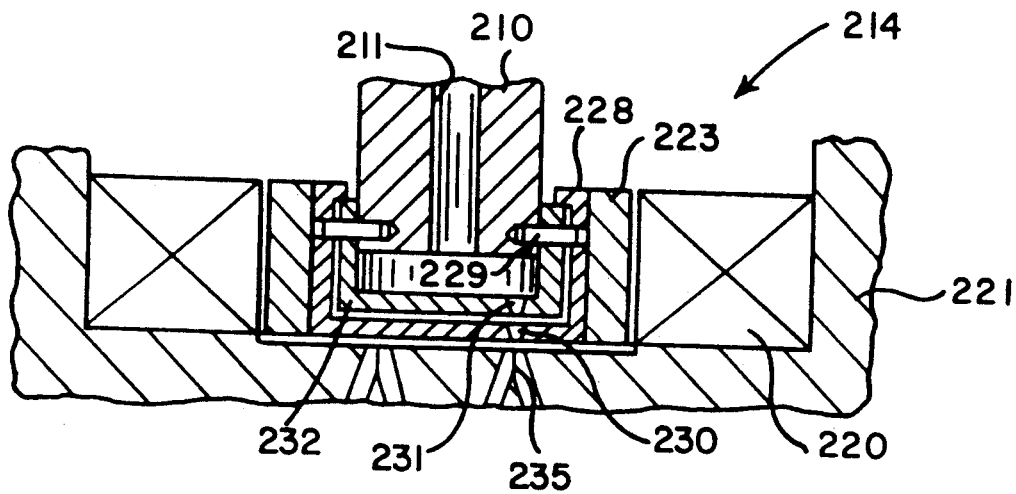
FIG. 18 is a sectional view taken along the line 18—18 of FIG. 17 further showing the selector and modulating elements of the multiplexing valve of FIG. 15.

The means for selecting and modulating fluid flow is best illustrated in connection with FIGS. 17 and 18. There is shown the rotatable shaft 210 coupled to the distribution means generally indicated at 214 associated with a magnetic forcer, which includes coils 220 disposed within a housing 221. When current is applied to the coils 220, they attract a magnetic permeable member 223 drawing it in one direction or the other, depending on which pair of coils is energized. The coil arrangement is best illustrated in FIG. 17 and, in the illustrated embodiment will cause, depending on the direction of current flow and the magnitude of the current flow, a deflection of the magnetic permeable member 223 to the left, to the right or on the diagonal between pole pairs. The magnetic permeable member 223 carries with it a deflector member 228, and those members are pinned at 229 for rotation in unison. The pin, however, allows the magnetically permeable member 223 with attached deflector member 228 to move radially so that the center of the deflector and magnetic permeable member can be deviated slightly from the center of rotation of the shaft 210.

It is seen that the deflector member 228 has a small deflector aperture 230 which can communicate between an off-center jet 231 in rotatable jet member 232 and the port pairs 235 which are fixed in the base member 221. Thus, rotation of the shaft 210 serves to rotate the jet 231 around a neutral circle 236 defined between the jet pairs (see FIG. 17b). When it is desired to modulate the flow, current of a particular sense and magnitude is applied to one of the coil pairs 224, 225, 226 which serves to deflect the magnetic permeable member 223 and the deflector 228 which it carries. While the jet 231 remains in its orbiting position, movement of the deflector 230 in a radial direction causes a differential split between the ports 235, achieving a similar result to that described in connection with FIG. 13. However, that is achieved without the deflection of the jet pipe or the necessity to tune the resonant frequency of the jet pipe to the nutating frequency.

In addition, it is possible to operate the FIG. 15 embodiment in a random select mode when the stepping motor 212 is of the variety which has a relatively high slew rate. More particularly, when it is desired to switch from one port to the other, even if those ports are not adjacent, it is possible to accelerate the motor for a portion of a full revolution from one set of ports to another without substantially affecting the intermediate ports, particularly since the unlocking mechanisms will not be substantially affected when the finger 216 slews quickly through the ports 217. Thus, it is possible to switch from one port to a distant port by quickly slewing then, having slewed the stepping motor to that position, stopping it in that position and modulating the signal for as long as is necessary to cause the desired effect in the channel, following which the stepping motor can be slewed to another selected port and the process repeated. As an alternative, of course, particularly in steady state operation, the stepping motor can smoothly step from port to port and the system operated in sequential fashion.

Figure 20:
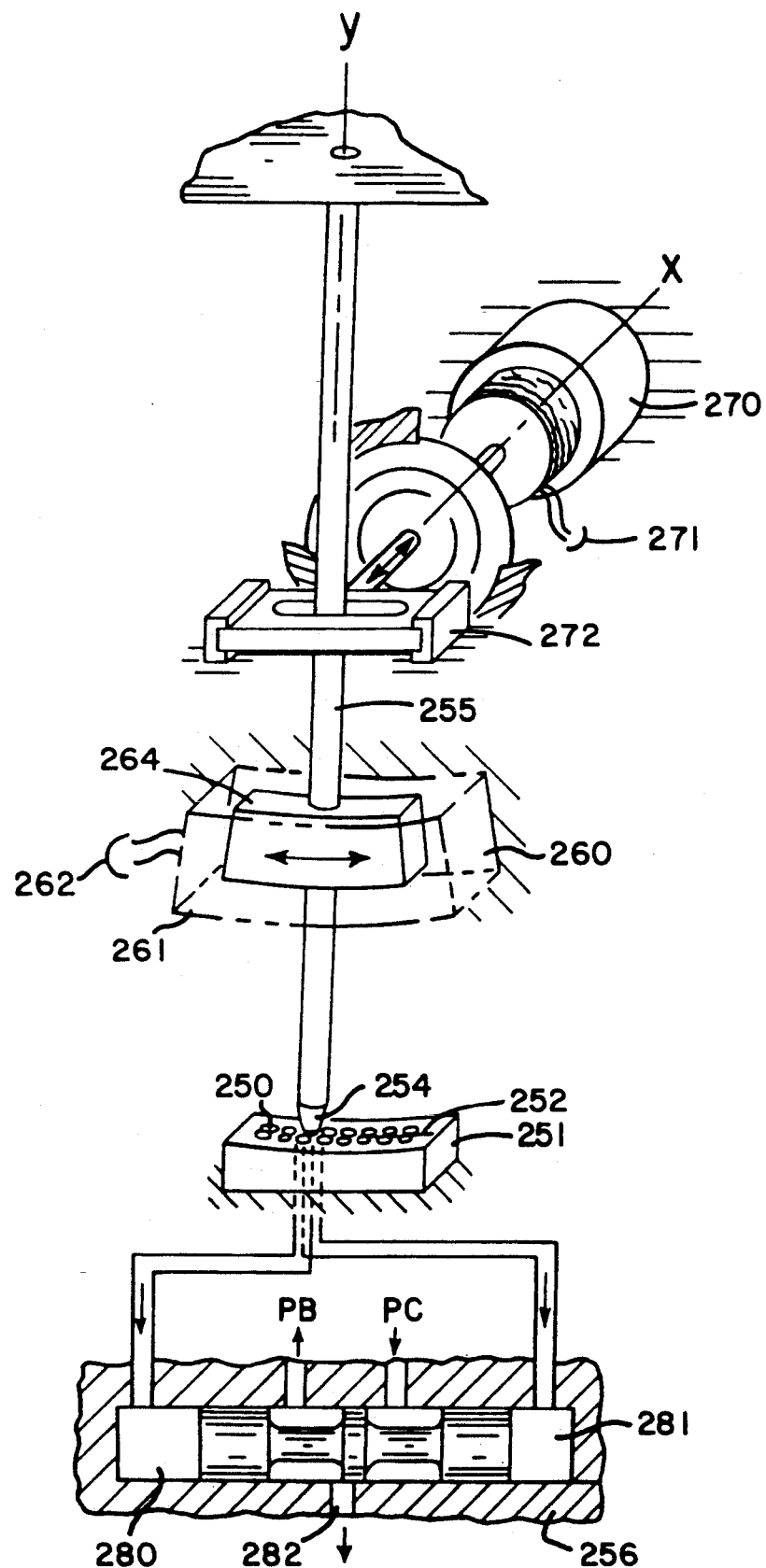
FIG. 20 is a diagrammatic view showing a multiplexed hydraulic control system representing yet a further embodiment of the present invention and utilizing a jet pipe with a linear array of ports selectively actuated and modulated by rectilinear motion of the jet pipe with respect to the ports.

A further jet pipe embodiment of the invention is illustrated in FIG. 20, and is particularly suited for random accessing of the outlet ports. More particularly, a plurality of paired ports 250 are provided in a valve member 251, and the paired ports are arranged in a linear array. A neutral line 252 disposed between the paired ports represents a "no actuation" position for traverse of a jet 254 of a jet pipe arrangement 255. Thus, any motion from left to right of the jet 254 over the neutral line 252 will cause no change in the position of the associated second stage valves, one of which is illustrated at 256. For causing selection of one of the pairs of ports, a rotary solenoid, preferably in the form of a rotary voice coil 260, is provided having a coil member 261 with an input bus 262 for receiving selection signals from the microprocessor, and a movable diaphragm 264 whose position is controlled by the signals applied to the input 262 to demand a particular angular position of the jet pipe 255. Thus, it is possible by applying current of a particular magnitude and sense to the inlet 262 to position the jet 254 of the jet pipe 255 over a selected receiver pair 250. Modulation is separately accomplished in the FIG. 20 embodiment by means of a linear actuator 270 having input leads 271 also connected to the microprocessor (not shown) for applying a modulating signal to the actuator 270. Thus, depending upon the sense and magnitude of the modulating signal applied to the actuator 270, a yoke 272 will move inwardly or outwardly, deflecting the jet 254 of the jet pipe preferentially toward one or the other of the receivers in a pair, causing a pressure differential in the chambers 280, 281 associated with the second stage valve and thereby movement of the second stage valve to alter flow through its outlet port 282. As in the case of slewing the stepping motor of the FIG. 15 embodiment, the selector actuator 260 of the FIG. 20 embodiment is a low mass fast acting device such that the jet 254 can be quickly indexed from one pair of ports to another distant pair of ports without substantially affecting the intermediate ports by which it has slewed, so that the processor has the option of random selection of ports and random assignment of dwell times to those ports depending upon the control requirements then being encountered.

While the embodiment of FIG. 20 does not illustrate the locking means of the FIGS. 13 and 15 embodiments, in the preferred embodiment, such locking means could also be provided.

Figure 21:
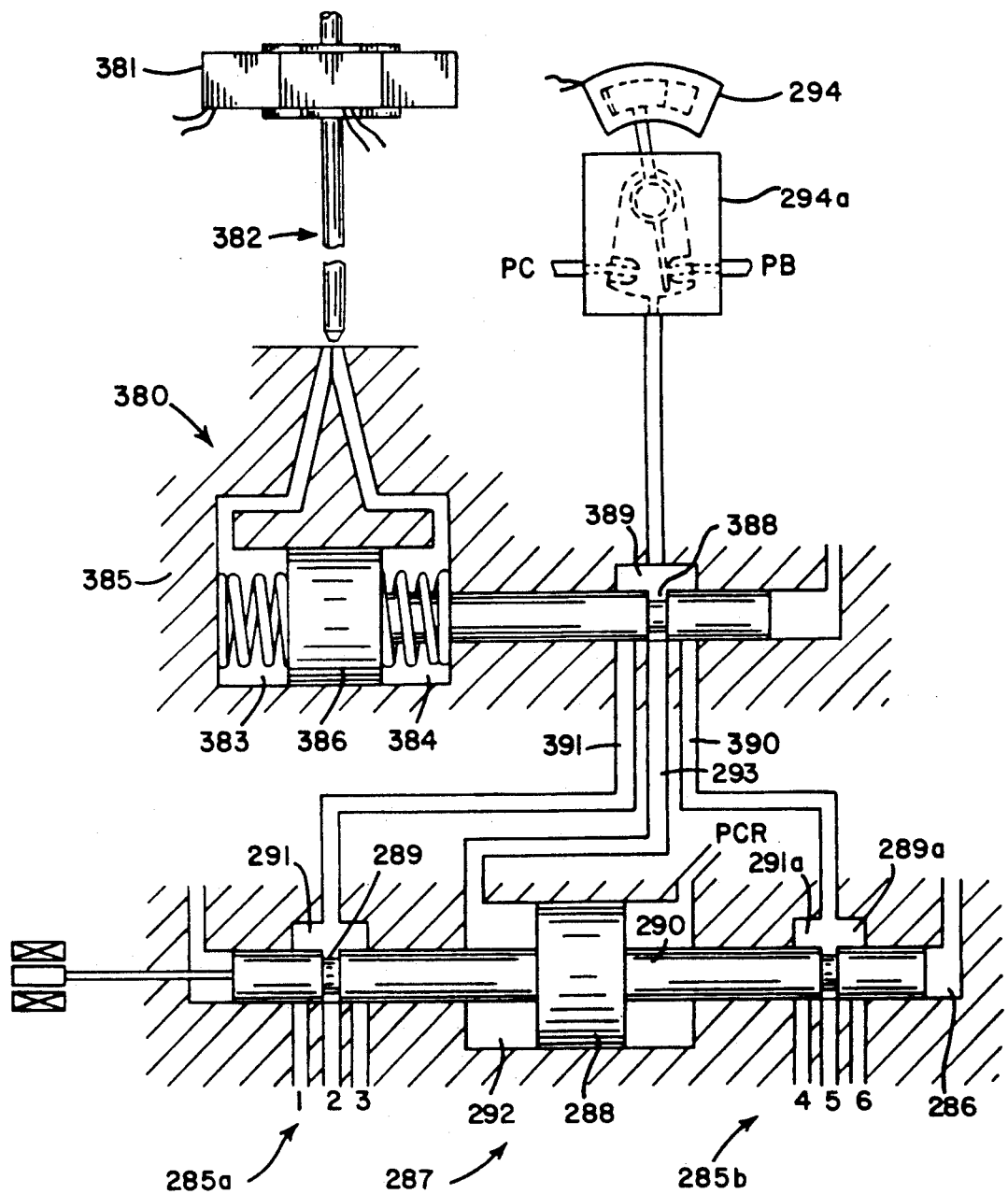
FIG. 21 is a block diagram illustrating a multiplex control system utilizing separate modulator and multiplex selector controls.

Directing attention now to FIG. 21, there is shown a control loop for a multiple channel multiplexed system, in the illustrated embodiment comprising three channels. The FIG. 21 embodiment also illustrates a further modification in that two of the channels include conventional servo actuators with position and rate feedback means, while the third channel includes an on/off actuator which requires no feedback means. Such a system illustrates that one or several on/off devices can be intermixed with the controlled position actuators in the multiplexed control, and that is particularly suitable in a random access system where the control can ignore the on/off channels except on the comparatively rare occasion when it is desired to switch from one state to the other.

Referring in greater detail to FIG. 21, there is shown an input buffer circuit 300 having three input signals coupled thereto on lines 301-303. Two of the input signals are like those described in connection with FIG. 1, i.e., have levels (typically current levels) which relate to a demanded position for the associated actuator. A third signal on line 303 is simply an on/off signal which demands that the actuator in the associated channel be switched either on or off. The signals, having passed through the buffer 300, are coupled to associated control loops 305, 306, 307. The loops 305 and 306 are similar to each other in that they compare the associated input signal from the buffer with a feedback signal on lines 308, 309, respectively for establishing an output signal which is proportional to the flow intended to be sent to the associated second stage valve in the next cycle. As noted above, the feedback signal is preferably both a position signal and a rate signal which, when combined with the input demand signal as will be described below, produces an output signal for controlling fluid flow to the associated actuator.

The on/off signal from the third channel is coupled to on/off level set controller 307, and in this case needs no feedback from the associated actuator. The three signals on the three controllers are coupled as inputs to a signal multiplexer 310 which has a single output bus 311, operated under the control of a master controller 320 to individually introduce signals onto the output bus 311 representative of the multiplexer input signals. As noted above, the signals can be in a sequential order, but the master controller 320 also has the ability, particularly operating in conjunction with a master computer for the aircraft, to vary not only the sequence of the signals output on the bus 311, but also their dwell time.

The sequence of control signals whose values are to determine the flow rate to selected channels are passed through a conventional driver circuit 313 which produces modulated output signals which are used to control a modulating actuator 321. It is recalled from the FIG. 1 embodiment that the modulating actuator which is responsive to an electrical signal to produce a corresponding hydraulic signal was illustrated as a torque motor 42 (or a voice coil) coupled to and driving a spool valve such as valve 41. As shown in FIG. 21, the modulating actuator has the hydraulic source PC and sump PB connected thereto, and serves to modulate between those levels in dependence on the electrical signal provided by the driver 313. The single hydraulic input produced by the modulating actuator 321 is coupled via a hydraulic line 322 to the input 323 of a multiplexing valve 325, one embodiment of which is the multiplexing valve 31 of FIG. 1. The multiplexing valve has selector inputs generally indicated at 326, in the form of electrical signals which control the coupling of the single input 322 to individual ones of a plurality of outputs 330, 331, 332. The FIG. 21 embodiment shows two electrical input lines 326 which is typical of the embodiments which utilize a pair of transducers for rectilinear or approximately rectilinear control of the valve elements such as the FIG. 1, FIG. 3 and FIG. 7 embodiments. The selector signals are produced by a multiplex selector driver 335 which in turn is responsive to the master controller 320. The master controller 320 thus has complete control over both the signal multiplexer 310 and the multiplex selector driver 335 such that by producing appropriate signals on its output it can cause the signal multiplexer 310 to select the electrical control signal for a channel to be altered, while at the same time imposing signals on the multiplex selector driver 335 to cause the multiplex valve to select that channel. Thus, the modulator 321 produces a hydraulic flow on input line 322 which it is desired to pass to the channel in question, and the multiplexer valve selects that channel for appropriately passing the signal to the selected channel.

Hydraulic outputs from the multiplex valve 323 found on lines 330, 331, 332 are coupled to the respective channels, and serve as inputs to second stage valves 340, 341, 342. As was described in connection with, for example, FIG. 1, the hydraulic signal received from the multiplexer causes translation of an internal spool in the second stage valve which causes flow to the valve output from either the high pressure source PC or to the low pressure sump PB. It is seen that output lines from the second stage valve are coupled via lines 343, 344 to appropriate servo actuators 345, 346, respectively. The servo actuators in turn are positioned in dependence upon the flow rate through the second stage valve which itself is a function of the flow rate received from the modulating actuator 321 by way of the multiplex valve 323.

As noted above, the servo valves include feedback means 347, 348 preferably for providing both position and rate of movement indication to the processor. The second stage valve 342 has its output coupled on a hydraulic line 349 to an on/off controller 350 and thereby toggles the controller 350 to the on or off condition, depending on the signal from its associated second stage valve.

As shown in FIG. 21, each of the feedback means may comprise a pair of feedback sensors. The first can include potentiometers 351, 352 which have signals passed through filter and gain circuitry 353 to provide the respective feedback signals 308, 309 which are passed to the controllers 305, 306. As noted above, such signals can provide both position information for use by the controller in driving the actuator to the demanded position established on lines 301, 302, and also rate information used by the controller 320 to stabilize the loop. In addition to the feedback potentiometers 351, 352, additional feedback sensors can include LVDT sensors 354, 355 having lines coupled as feedback to the master controller, such as the master controller for the aircraft. The master controller may sense the position of the servos through the feedback means and adjust the demand signals on lines 301, 302 to achieve actuator positions which might be computed by a master onboard computer.

Figure 22:
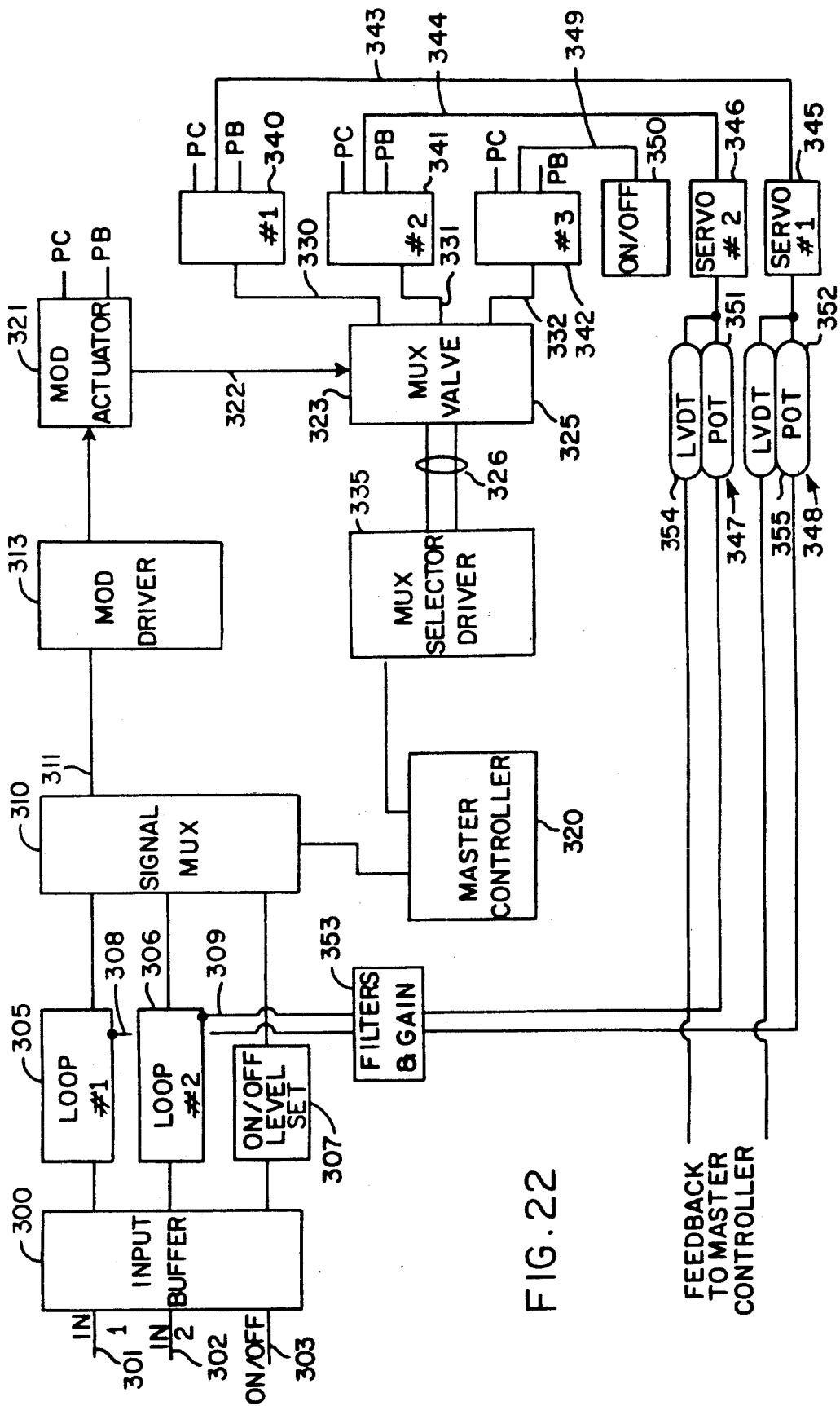
FIG. 22 is a similar block diagram illustrating a multiplexed control system in which the modulation signal and selector signals are combined for application to a single actuator.

It is noted that in certain of the embodiments, such as the jet pipe embodiments illustrated in connection with FIG. 9 et seq., and in the linear output port array configuration of FIG. 20, in some cases it is necessary to combine the selector electrical signal for the multiplexer with the modulator electrical signal, and pass the combined signals to a torquer which can control, for example, the position of the jet pipe both for purposes of selection and modulation. FIG. 22 illustrates a control circuit capable of accomplishing that in an environment where the output elements are the same as indicated in, e.g. FIG. 20 and the input elements up to the modulation driver 313 and multiplex selector driver 335 are the same as in connection with FIG. 21. However, in contrast to FIG. 21 which had separate selector and multiplexer actuators, in the embodiment of FIG. 22 the signals from the modulation driver 313 and the multiplex selector driver 335 are combined in a summing amplifier 360, the output of which is used to drive a control means such as the illustrated multiplexed jet pipe 361. It is seen that the jet pipe has a hydraulic input from the high pressure source PC, and paired outputs 362, 363, 364 connected to the respective channels. As was noted in connection with describing the mechanisms for achieving the multiplexing, the signal coupled through the summing amplifier 360 to the jet pipe multiplexer (such as the two-axis torquer of FIG. 12), serves to first of all position the jet pipe over a particular pair of receivers in dependence upon the signal received from the selector driver 335, then to slightly alter that position in connection with the modulation signal received from modulation driver 313 to controllably split flow between receivers in the pair and thereby controllably adjust the position of the second stage valve and thereby the flow rate to the actuator. In the case where it is desired to position the jet pipe over the receiver pair before applying the modulating signal for altering the position, an enable signal 366 is used as an input to the modulating driver 313 so as to enable the output signal of the modulating driver only when it is desired to modulate the position of the jet pipe. Thus, in that mode, selection can be accomplished via the multiplex selector driver 335 to position the jet pipe in the null position over a selected receiver port pair, following which the enable signal on line 366 can be activated to pass the modulating signal on bus 311 through the modulation driver 313 to thereby alter the jet pipe position for achieving modulation. Alternatively, the enable signal on line 366 can be maintained continuously activated so that as the jet pipe swings in toward a port pair, it is already in the modulating position and can commence its work immediately upon reaching the predetermined control position.

It will now be apparent that what has been provided is an improved hydraulic multiplexed control system in which the controller has extreme flexibility for the order in which channels are to be serviced and the dwell time for servicing of each channel. Even though in normal operation it may prove desirable for the controller to service the ports in sequence, in emergency or abnormal conditions the controller, when properly programmed, has the flexibility to give most attention to the channels which are most critical, a feature noticeably absent in the use of rotary multiplexers.

What is claimed is:

1. A multiplexed hydraulic control system having a plurality of channels for individually controlling the positions of a plurality of actuators in the respective channels in accordance with a corresponding plurality of electrical control signals, the control system comprising the combination of:

a single hydraulic input carrying hydraulic fluid to be individually and selectively passed to the respective channels, modulating means for responding to an applied electrical signal and associated with the single hydraulic input for producing a modulated hydraulic flow dependent upon the magnitude of the applied electrical signals, a plurality of output ports arranged in a predetermined planar two-dimensional array and connected to the respective channels for passing modulated hydraulic fluid thereto for control of the positions of the actuators in the associated channels, multiplexing means responsive to a plurality of selector signals for selecting among the output ports and connecting the single input to a selected output port by relative movement between the inlet and the array of output ports, and control means for selectively coordinating the application of the plurality of electrical control signals to the modulating means and the selector signals to the multiplexing means for providing hydraulic flow to each of the channels which is in accordance with the electrical control signals associated with those channels.

2. The multiplexed hydraulic control system of claim 1 in which the predetermined array of output ports comprises a two-dimensional array disposed along a pair of orthogonal axes, and the multiplexing means comprises means for controllably translating the input with respect to said axes for connecting the hydraulic input to individual ones of the hydraulic output ports.

3. The multiplexed hydraulic control system of claim 2 in which the two-dimensional array of output ports comprises a rectangular grid, the multiplexing means including a pair of electrically responsive actuators connected to a multiplexing valve, the electrically responsive actuators being disposed along the orthogonal axes for producing controllable translation of the multiplexing valve along said axes to connect the hydraulic input to individual ones of the hydraulic output ports.

4. The multiplexed hydraulic control system of claim 2 in which the predetermined array of output ports comprises a generally circular array, the multiplexing means including a pair of electrically responsive actuators and linkage means connected to said actuators for controllably translating the input port to individual ones of the hydraulic output ports in said circular array.

5. The multiplexed hydraulic control system of claim 1 in which the predetermined array of output ports comprises an array of paired jet pipe receivers disposed in a substantially circular array, the hydraulic input comprising a jet pipe, the multiplexing means comprising means for selectively positioning the jet pipe over a selected pair of receivers and the modulating means comprising means for controllably splitting flow from the jet pipe between the receivers in the selected pair.

6. A multiplexed hydraulic control system having a plurality of channels for individually controlling the positions of a plurality of actuators in the respective channels in accordance with a corresponding plurality of electrical control signals, the control system comprising the combination of:

a multiplexing valve having a plurality of output ports arranged in a predetermined planar two-dimensional array, each output port being connected to its associated hydraulic channel for passing hydraulic fluid thereto;

a hydraulic input selectively modulated in accordance with individual ones of the plurality of electrical signals;

multiplexing means responsive to a plurality of selector signals for selectively connecting the hydraulic input to individual ones of the hydraulic output ports; and control means for controlling the multiplexing means in coordination with said electrical signals for distributing modulated hydraulic fluid to the associated channels under a program of control for positioning of said actuators.

7. The multiplexed hydraulic control system of claim 6 in which the predetermined array of output ports comprises a two-dimensional array disposed along a pair of orthogonal axes, and the multiplexing means comprises means for controllably translating the input with respect to said axes for connecting the hydraulic input to individual ones of the hydraulic output ports.

8. The multiplexed hydraulic control system of claim 7 in which the two-dimensional array of output ports comprises a rectangular grid, the multiplexing means including a pair of electrically responsive actuators connected to the multiplexing valve, the electrically responsive actuators being disposed along the orthogonal axes for producing controllable translation of the multiplexing valve along said axes to connect the hydraulic input to individual ones of the hydraulic output ports.

9. The multiplexed hydraulic control system of claim 7 in which the predetermined array of output ports comprises a generally circular array, the multiplexing means including a pair of electrically responsive actuators and linkage means connecting the multiplexing valve to said actuators for controllably translating the input port to individual ones of the hydraulic output ports in said circular array.

10. The multiplexed hydraulic control system of claim 6 in which the predetermined array of output ports comprises an array of paired jet pipe receivers disposed in a substantially circular array, the hydraulic input comprising a jet pipe, the multiplexing means comprising means for selectively positioning the jet pipe over a selected pair of receivers.

11. The multiplexed hydraulic control system of claim 6 in which the program of control for positioning of said actuators comprises a non-sequential program for servicing said channels in dependence on the channels demands.

12. The multiplexed hydraulic control system of claim 6 in which the program of control for positioning of said actuators comprises a sequential program for sequentially actuating said channel in a predetermined and repeating sequence in associated time slots dedicated to the channels.

13. The multiplexed hydraulic control system of claim 6 in which the program of control for positioning of said actuators comprises a non-sequential program including means for servicing the channels in any desired sequence and means for servicing each channel for a time which is independent of the servicing time of the other channels in the system.

14. The multiplexed hydraulic control system of claim 6 in which the predetermined array of output ports comprises a planar array of output ports connected to the respective channels, the ports in the planar array being arranged in a rectangular array;

the multiplexing means comprising a pair of slidable members each having a linear array of ports, the linear arrays being arranged perpendicular to each other, the slidable members being positioned such that linear positioning of the members tends to align a port in each with a selected port in the output port array, and means for linearly positioning the members for selectively actuating individually each of the output ports.

15. The multiplexed hydraulic control system of claim 6 in which the predetermined array of output ports comprises a planar array of output ports arranged in an annulus;

the multiplexing means comprising a disk slidable on a planar surface of the multiplexing valve, the disk having at least one aperture for selective and individual alignment with the output ports; and means for selectively positioning the disk along two axes on the planar surface for individually and selectively aligning the input with selected output ports for controlling fluid flow to the associated channels.

16. The multiplexed hydraulic control system of claim 6 in which the multiplexing means comprises a jet pipe inlet and a plurality of output port pair receivers, the multiplexing means comprising means for positioning the output of the jet pipe in association with a selected one of the port pairs, and means for deflecting the jet pipe with respect to the port pair to split fluid flow through the jet pipe between ports in a pair for modulating outlet fluid flow through the port pair, and second stage valve means connected to the outputs and positioned in response to the split of fluid flow between the ports in the associated pair.

17. The multiplexed hydraulic control system of claim 16 further including locking means for the second stage valve means which locks a second stage valve in a previously adjusted position except when the associated port pair is selected.

18. The multiplexed hydraulic control system of claim 17 further including detent means associated with the multiplexing valve for establishing the positions at which the input is connected to the respective output ports of the multiplexing valve, and for unlocking the locking means.

19. The multiplexed hydraulic control system of claim 17 in which the locking means comprises means for selectively applying a side load to the second stage valve means.

* * * * *